(12) United States Patent
Aycock et al.

(10) Patent No.: US 10,962,625 B2
(45) Date of Patent: *Mar. 30, 2021

(54) CELESTIAL POSITIONING SYSTEM AND METHOD

(71) Applicant: Polaris Sensor Technologies, Inc., Huntsville, AL (US)

(72) Inventors: Todd M. Aycock, Huntsville, AL (US); Arthur Lompado, Huntsville, AL (US); David Chenault, Huntsville, AL (US); Adam Smith, Huntsville, AL (US)

(73) Assignee: Polaris Sensor Technologies, Inc., Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/455,029

(22) Filed: Jun. 27, 2019

(65) Prior Publication Data

US 2019/0331762 A1 Oct. 31, 2019

Related U.S. Application Data

(63) Continuation-in-part of application No. 15/973,908, filed on May 8, 2018, now Pat. No. 10,408,918,
(Continued)

(51) Int. Cl.
*G01S 5/16* (2006.01)
*G01S 3/786* (2006.01)
(Continued)

(52) U.S. Cl.
CPC .............. *G01S 5/163* (2013.01); *G01S 3/783* (2013.01); *G01S 3/7861* (2013.01);
(Continued)

(58) Field of Classification Search
None
See application file for complete search history.

(56) References Cited

U.S. PATENT DOCUMENTS

| | | | | |
|---|---|---|---|---|
| 6,175,327 B1 * | 1/2001 | Lin | ...................... | H01Q 3/2611 342/357.64 |
| 8,553,980 B2 * | 10/2013 | Ahn | ...................... | G06K 9/4671 348/94 |

(Continued)

*Primary Examiner* — Andrae S Allison
(74) *Attorney, Agent, or Firm* — Angela Holt; Bradley Arant Boult Cummings LLP

(57) ABSTRACT

In a method of determining the position of an object, raw image data of the sky is recorded using a celestial imaging unit. The last known position, orientation, date, and time data of the object are obtained, and the position of a celestial body is measured. A latitude and longitude of the object is determined by matching the measured celestial body position to the expected celestial body position based on the input parameters. A system for determining a new position of an object comprises a celestial imaging unit configured to record image data of the sky, a signal processing unit, and a signal processing unit configured to receive and store in memory the image data received from the celestial imaging unit. The signal processing unit filters the image to find the positions of celestial objects in the sky. The signal processing unit is further configured to use roll and pitch from an IMU, and date and time from a clock to determine the object's position (latitude and longitude).

18 Claims, 21 Drawing Sheets

(11 of 21 Drawing Sheet(s) Filed in Color)

Related U.S. Application Data which is a continuation of application No. 15/240,663, filed on Aug. 18, 2016, now Pat. No. 9,989,625, which is a continuation of application No. 14/521,401, filed on Oct. 22, 2014, now Pat. No. 9,423,484.

(60) Provisional application No. 62/690,449, filed on Jun. 27, 2018, provisional application No. 61/894,023, filed on Oct. 22, 2013.

(51) Int. Cl.
  *G06K 9/20* (2006.01)
  *H04N 7/18* (2006.01)
  *G06T 7/70* (2017.01)
  *G06K 9/00* (2006.01)
  *G06K 9/46* (2006.01)
  *G01S 5/02* (2010.01)
  *G01S 3/783* (2006.01)

(52) U.S. Cl.
  CPC .......... *G01S 3/7862* (2013.01); *G01S 5/0263* (2013.01); *G01S 5/16* (2013.01); *G06K 9/00624* (2013.01); *G06K 9/00671* (2013.01); *G06K 9/209* (2013.01); *G06K 9/4604* (2013.01); *G06T 7/70* (2017.01); *H04N 7/183* (2013.01); *G06T 2207/20061* (2013.01); *G06T 2207/30181* (2013.01)

(56) References Cited

U.S. PATENT DOCUMENTS

| | | | | |
|---|---|---|---|---|
| 9,989,625 B2* | 6/2018 | Aycock | ................. | G01S 3/7861 |
| 10,408,918 B2* | 9/2019 | Aycock | ................. | G06K 9/209 |
| 2003/0103651 A1* | 6/2003 | Novak | ................. | G01C 11/02 |
| | | | | 382/106 |
| 2005/0168381 A1* | 8/2005 | Stephens | ................. | G01S 7/026 |
| | | | | 342/146 |
| 2007/0069946 A1* | 3/2007 | Kaplan | ................. | G06Q 30/02 |
| | | | | 342/357.64 |
| 2007/0131782 A1* | 6/2007 | Ziehr | ................. | B60H 1/0075 |
| | | | | 236/1 B |
| 2012/0116711 A1* | 5/2012 | Bruns | ................. | G01C 17/34 |
| | | | | 702/150 |
| 2012/0242835 A1* | 9/2012 | Li | ................. | G08G 1/167 |
| | | | | 348/148 |
| 2014/0022539 A1* | 1/2014 | France | ................. | G01S 19/48 |
| | | | | 356/139.1 |
| 2014/0336953 A1* | 11/2014 | Johnson | ................. | G01N 21/538 |
| | | | | 702/24 |
| 2015/0042793 A1* | 2/2015 | Belenkii | ................. | G01S 3/7867 |
| | | | | 348/143 |

* cited by examiner

CELESTIAL POSITIONING SYSTEM AND METHOD

REFERENCE TO RELATED APPLICATIONS

This application claims priority to Provisional Patent Application U.S. Ser. No. 62/690,449, entitled "Celestial Positioning System" and filed on Jun. 27, 2018, which is fully incorporated herein by reference. This application is also a continuation-in-part of U.S. patent application Ser. No. 15/973,908, filed May 8, 2018 and titled "Sky Polarization and Sun Sensor System and Method," which was a continuation of U.S. application Ser. No. 15/240,663 entitled "Sky Polarization and Sun Sensor System and Method" and filed on Aug. 18, 2016, which was a continuation of patent application Ser. No. 14/521,401, filed on Oct. 22, 2014, and issued as U.S. Pat. No. 9,423,484, which claimed the benefit of and priority to Provisional Patent Application U.S. Ser. No. 61/894,023, entitled "Sky Polarization and Sun Sensor for GPS-Denied Localization" and filed on Oct. 22, 2013. All of the above-listed applications are fully incorporated herein by reference.

GOVERNMENT LICENSE RIGHTS

This invention was made with government support under Contract Number W31P4Q-17-C-0043 awarded by the Department of Defense. The government has certain rights in the invention.

BACKGROUND AND SUMMARY

In a typical navigation solution, the measurements of an inertial measurement unit (IMU) and the Global Positioning System (GPS) are combined to determine the object's position and orientation, also called localization. In the simplest description, the IMU provides information about the object's orientation, whereas the GPS provides information about position. As used herein, "orientation" generally refers to roll, pitch, and heading. "Position" generally refers to latitude and longitude. In some cases, position may also refer to altitude. In practice, these two systems (IMU and GPS) are fused together where each system provides a redundant measure to the other.

However, there are situations where GPS location information is not available. In this case, the navigation system typically relies on dead reckoning localization (e.g., using inertial measurements from the IMU). Such localization analysis, however, is subject to drift and error accumulation, as the position is not constrained by the GPS. Many navigation systems have a vulnerability resulting from degradation or denial of the GPS signals used for navigation and targeting through jamming, spoofing, or other interference. In order to maintain assured navigation and position, alternatives to current GPS position information are required. It is desired that these alternative technologies can provide improved orientation and position sensing in a small package and contribute to a GPS-denied navigation and localization solution.

In the scenario of primary concern, a vehicle, person, or platform would lose (or begin with no) access to GPS information, thus losing its global position reference. In the hardest version of this scenario, a platform is turned on and must determine its absolute position in the absence of GPS with limited a priori knowledge. This scenario applies to a number of different operational conditions many of which need the meter scale of accuracy currently supplied by GPS. However, there are situations in which a much lower precision of position is sufficient. Some examples include artillery surveying and emplacement, and ship navigation.

The ultimate solution is for an alternative GPS navigation system to be able to operate completely independent of GPS. This is quite challenging and a system that achieves 100% availability will most likely involve a number of components or approaches working together. Availability in this sense refers to the state of the sensor being capable of performing within the requirements. Depending on the approach, availability may be impacted by time of day, visibility of the environment, availability of organic radio frequency signals, presence of known friendly elements, motion characteristics of the platform, terrain, weather, radio frequency and electromagnetic interference (RF/EMI), or many other factors. One common scenario begins with known location and time (from GPS or otherwise) and then the platform moves into an area where GPS is unreliable for the rest of the trip. In this case, effective dead reckoning can enable navigation success for a limited time.

Each type of fundamental navigation technology has limitations: GPS, while widely used and considered industry standard, can be denied and spoofed; inertial systems only provide a temporary solution as they only sense relative position change and are subject to drift; and vision-based approaches require areas to be accurately mapped beforehand. An alternative solution is presented, called a Celestial Positioning System (CPS), which can provide absolute position without a prior map, similar to GPS. It is not susceptible to the other limitations described previously: it cannot be denied or spoofed. The technology's only limitation is that it requires a clear view of the sky.

The position of a celestial object in the sky is generally unique for a given date, time, and orientation. Thus, a system which accurately measures the position of a celestial object, with the knowledge of date, time, and orientation, can determine the unique, absolute, global latitude and longitude. The inverse is also true, in that a system which measures the position of a celestial object, with knowledge of date, time, roll, pitch, and position, can determine unique absolute heading, as explained in U.S. Pat. No. 9,423,484, title Sky Polarization and Sun Sensor System and Method. The celestial objects may include the Sun, the Moon, planets, and stars. For daytime, the observed polarization of light reflected at any position in the sky depends on the positions of the Sun and the sensor platform, as well as the sensor pointing direction, where "sensor pointing direction" is the center point of the field of view of the sensor, also known as the target point. The target point, sensor platform position, and sun position together define a plane, which allows the measurement of the azimuth and elevation of the celestial object, even if it is not visible. Given the Sun's position (which is a function of the time of day), polarization measurements at one or more unique pointing directions, and the roll/pitch of the sensor, the sensor latitude and longitude or sensor heading may be derived.

A method according to the present disclosure calculates position parameters (latitude and longitude) using a celestial imaging system that takes images of celestial objects (or bodies) or their polarization signature in the sky. Celestial objects are hereby defined to include one or more of the following: the Sun, the Moon, planets, or stars. The position parameters can be useful to a navigating vehicle (especially if GPS is denied, spoofed, or unavailable), and can work in all types of vehicles (including ground, air, and naval vehicles). The position parameters can also be useful to target locating systems such as far target locators and surveying equipment or to personal positioning equipment used by dismounted soldiers or hikers. In addition to position parameters, the method may be reversed, with additional inputs of position (latitude and longitude), where the system outputs heading. The method can provide 0.1 degree heading accuracy or <100 m position accuracy, depending on the input parameters and desired output. Further, the method could be applied during daytime, twilight, or nighttime conditions and under varying levels of cloud cover.

A system according to an exemplary embodiment of the present disclosure comprises one or more imaging sensors, optics, mechanical housing, memory and logic circuitry, inertial measurement unit (IMU), GPS, clock, and embedded software that determine the orientation and position parameters. A method according to an exemplary embodiment of the present disclosure comprising using images of celestial objects in the sky and prior position/orientation/time data from the GPS, IMU, and clock, to determine expected azimuth and elevation of the celestial bodies, comparing these expected azimuth and elevation with measured feature locations, and then filtering to calculate a better orientation and position estimate of the observer (the system). This localization estimate can be provided in any number of interfaces to a navigation system, a user, a display, a survey platform, or a target locator.

DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
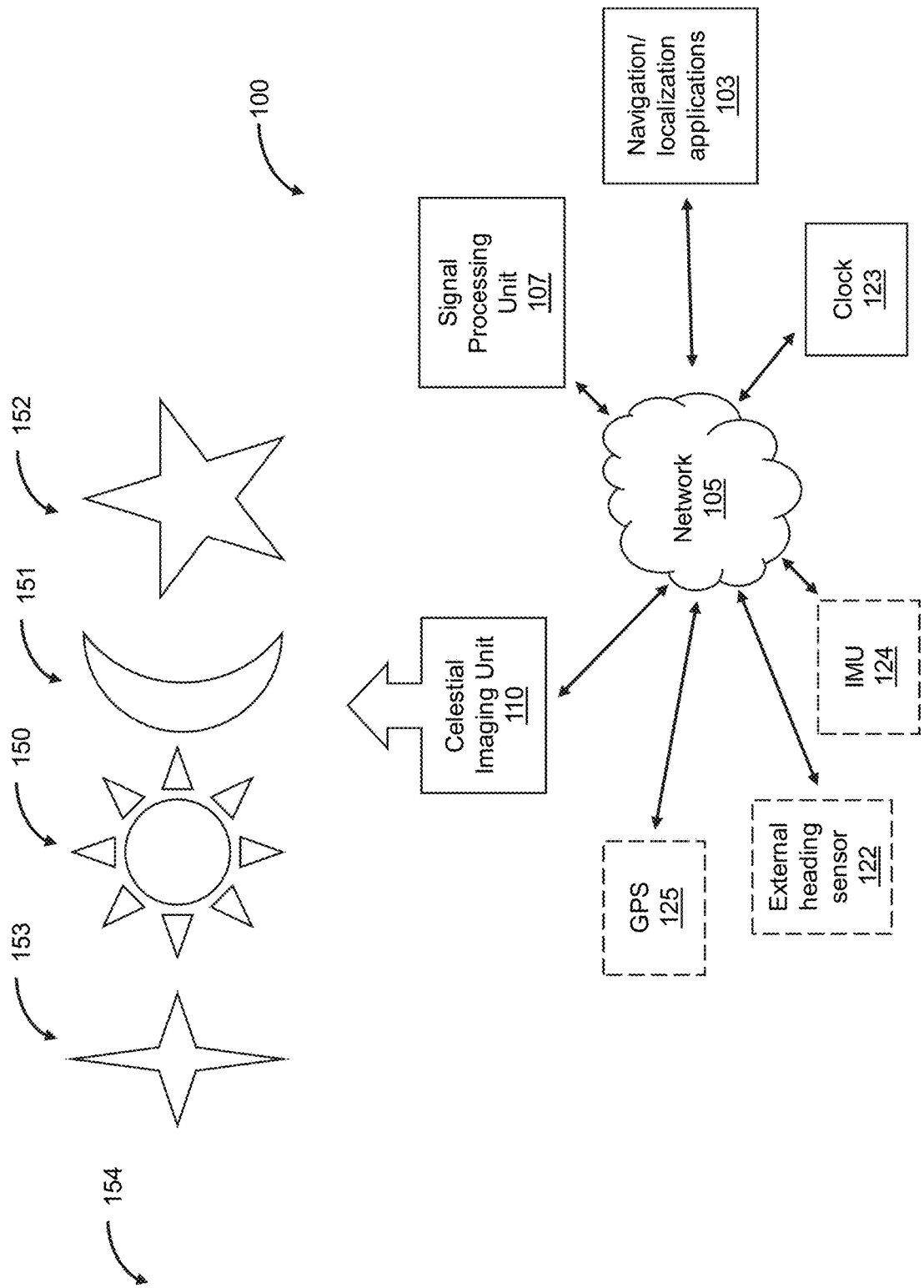
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a celestial imaging unit 110 and a signal processing unit 107 which collect and analyze images of celestial bodies (150-153) or their polarization signature in the sky, respectively.

The celestial imaging unit 110 comprises a video imaging device (not shown) for recording images of the sky 154, such as a digital video camera that collects images in its field of view (FOV); in this case, the images recorded are of celestial objects in the sky 154, including the Sun 150, the Moon 151, planets/stars 152, or their respective sky polarization signature 153. The celestial imaging unit 110 transmits raw image data to the signal processing unit 107, which processes the data and performs navigation and/or localization analysis, as further discussed herein. Although FIG. 1 shows the celestial imaging unit 110 and the signal processing unit 107 as two separate items, the celestial imaging units 110 and signal processing unit 107 are packaged into one device in certain embodiments. In some embodiments, the celestial imaging unit 110 may be a sky polarimeter, as described in U.S. Pat. No. 9,423,484, titled "Sky Polarization and Sun Sensor System and Method."

The celestial imaging unit sends raw image data (not shown) to the signal processing unit 107 over a network 105. The signal processing unit 107 may be any suitable computer known in the art or future-developed. The signal processing unit 107 receives the raw image data, filters the data, and analyzes the data as discussed further herein to provide navigation/localization information (not shown) to navigation/localization applications 103.

The navigation/localization applications 103 may be any of a number of applications wherein localization or navigation data is necessary, for example, in situations where GPS or heading is not available. Non-limiting examples of navigation/localization applications are: navigation systems, artillery or gun sights, far target locators, personal GPS units, mobile devices, surveying equipment, auto-pilot systems, and the like.

The system 100 may comprise a Global Positioning System (GPS) 125, an Inertial Measurement Unit (IMU) 124, and/or a heading sensor 122. A Global Positioning System is a satellite-based location device that primarily provides a user with latitude, longitude, altitude, and timing information. An inertial measurement unit is an electronic device that measures and reports on an object's/platform's velocity and/or orientation, providing a user with roll, pitch and heading information. A heading sensor is any sensor which may provide heading external to an IMU, such as a magnetic compass or a ring laser gyroscope. In some embodiments, the heading may be provided by the IMU. In other embodiments, the heading may be provided by a celestial heading sensor, configured to provide heading with inputs of roll, pitch, date, time, and prior latitude and longitude, as described in U.S. Pat. No. 9,423,484, titled "Sky Polarization and Sun Sensor System and Method." Even though an exemplary use of the system 100 is for GPS-denied environments, in some instances a navigation system (not shown) will have GPS and IMUs available for a time. In those instances, the information provided by a GPS or IMU may be used to inform the results of the localization analysis, as further discussed herein.

In some embodiments, the system 100 further comprises a clock 123 to provide the current time and date. Time/date may alternatively be available from the GPS 125.

The network 105 may be of any type network or networks known in the art or future-developed, such as the internet backbone, Ethernet, Wifi, broadband, coaxial cable, and the like. The network 105 may be any combination of hardware, software, memory, or all of the above.

Figure 2:
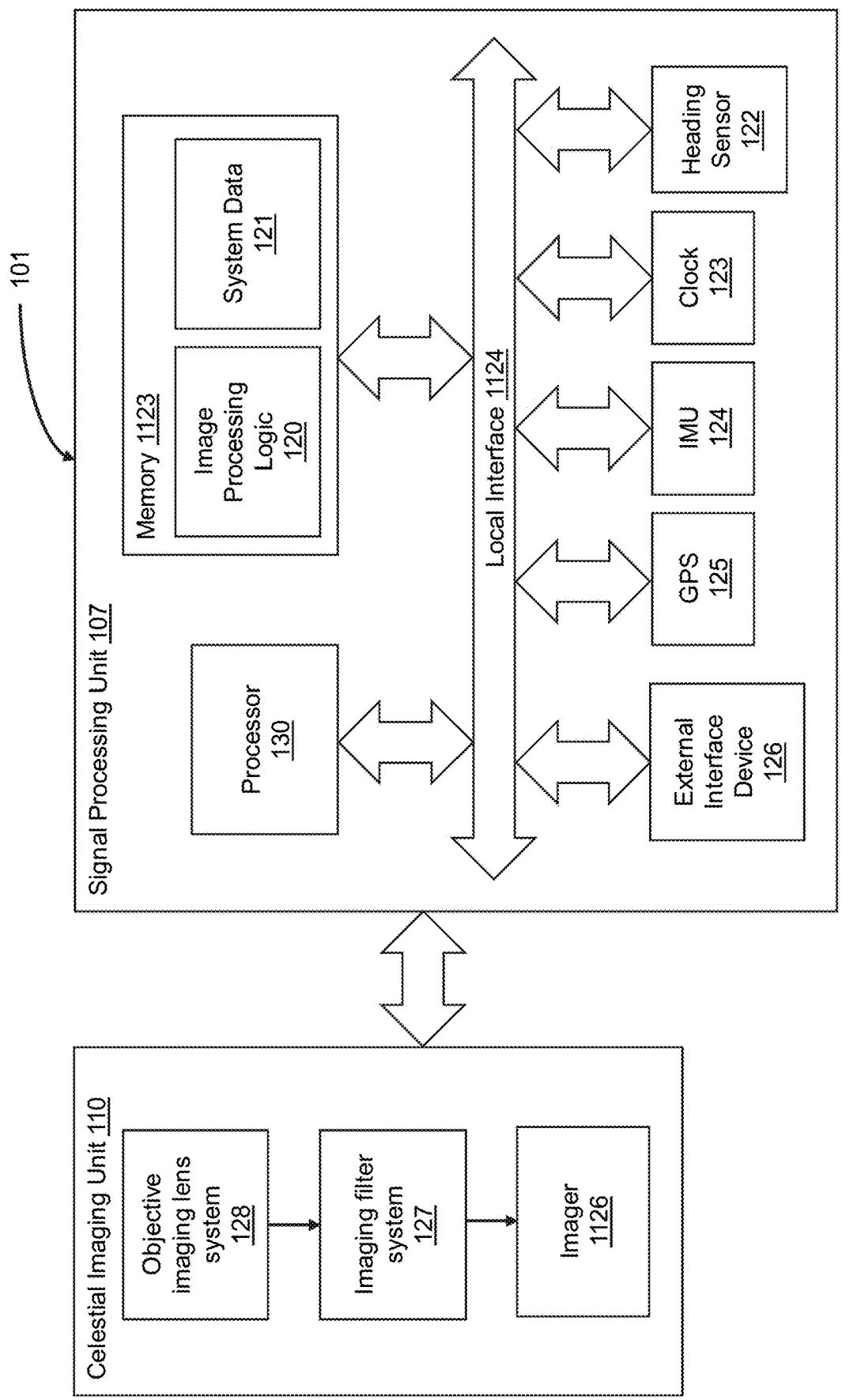
FIG. 2 depicts an exemplary celestial imaging unit and signal processing unit as depicted in FIG. 1.

FIG. 2 depicts an exemplary celestial imaging unit 110 and signal processing unit 107 according to an embodiment of the present disclosure. The celestial imaging unit 110 and signal processing unit 107 are sometimes referred to herein collectively as the celestial imaging system 101.

The celestial imaging unit 110 comprises an objective imaging lens system 128, an imaging filter system 127, and an imager 1126. The objective imaging lens system 128 comprises a plurality of optical trains (not shown) pointed at the sky 154 (FIG. 1). The imaging filter system 127 filters the images received from the objective imaging lens system 128. These filters may be neutral density (ND), waveband filtering (i.e., bandpass), polarizing elements, and others. The imager 1126 comprises a focal plane array (not shown) that comprises an array of light sensing pixels.

The signal processing unit 107 comprises image processing logic 120 and system data 121. In the exemplary signal processing unit 107 image processing logic 120 and system data 121 are shown as stored in memory 1123. The image processing logic 120 and system data 121 may be implemented in hardware, software, or a combination of hardware and software.

The signal processing unit 107 also comprises a processor 130, which comprises a digital processor or other type of circuitry configured to run the image processing logic 120 by processing the image processing logic 120, as applicable. The processor 130 communicates to and drives the other elements within the signal processing unit 107 via a local interface 1124, which can include one or more interfaces. When stored in memory 1123, the image processing logic 120 and the system data 121 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
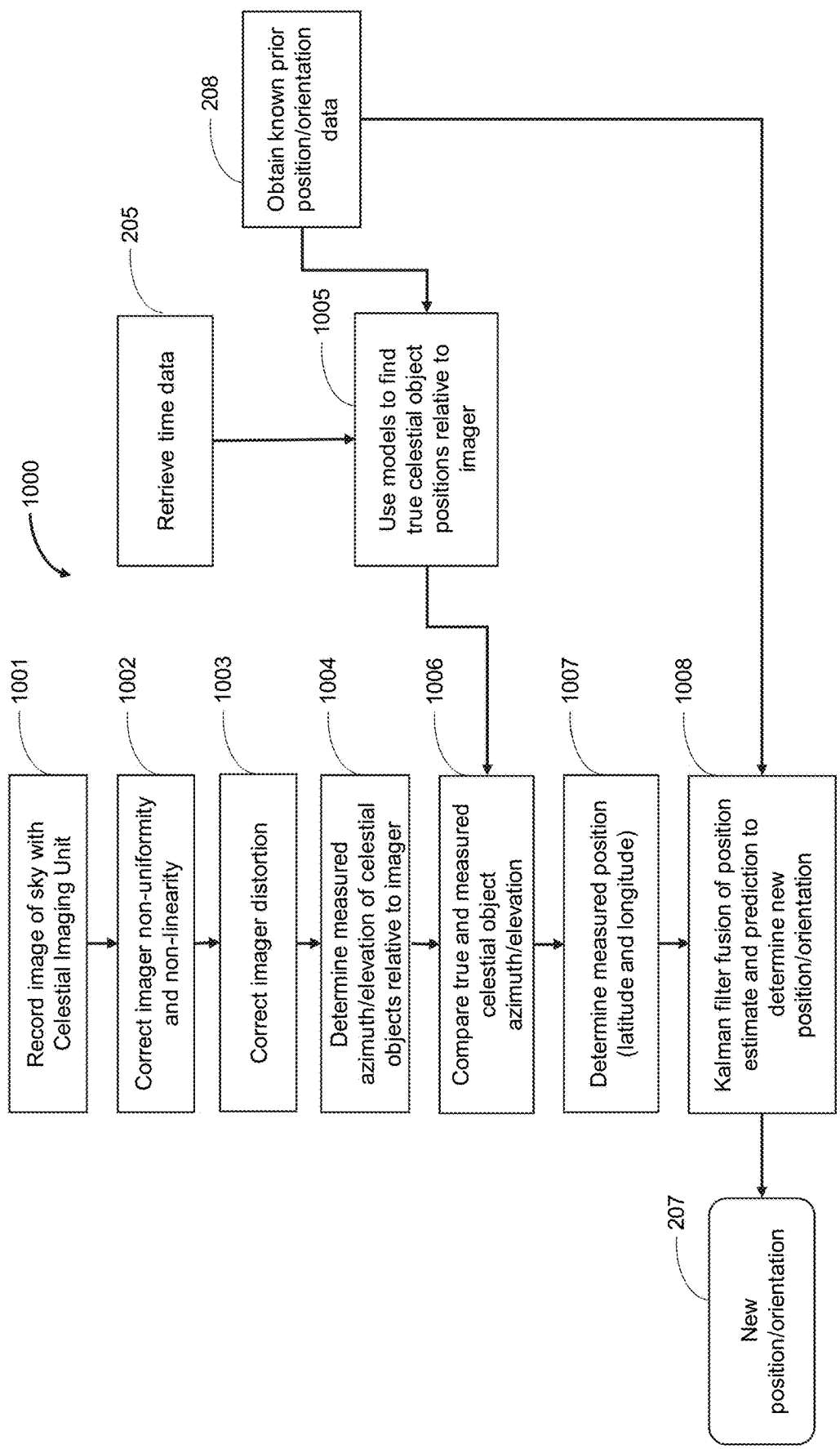
FIG. 3 is a flowchart depicting exemplary architecture and functionality of the system logic in accordance with an exemplary embodiment of the disclosure.
Figure 4:
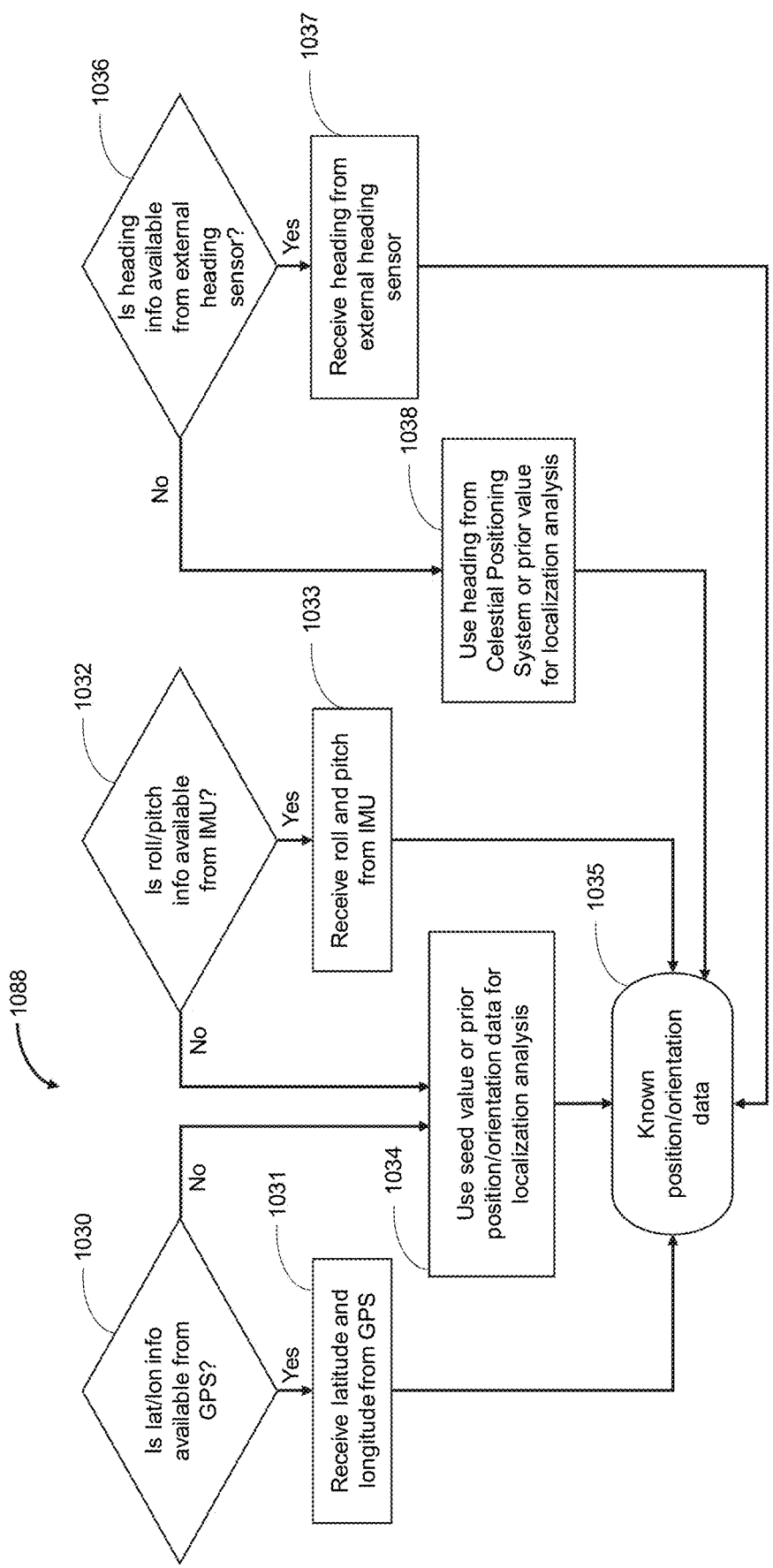
FIG. 4 is a flowchart depicting exemplary architecture and functionality of the step of obtaining known position/orientation data, as depicted in FIG. 3b.
Figure 5:
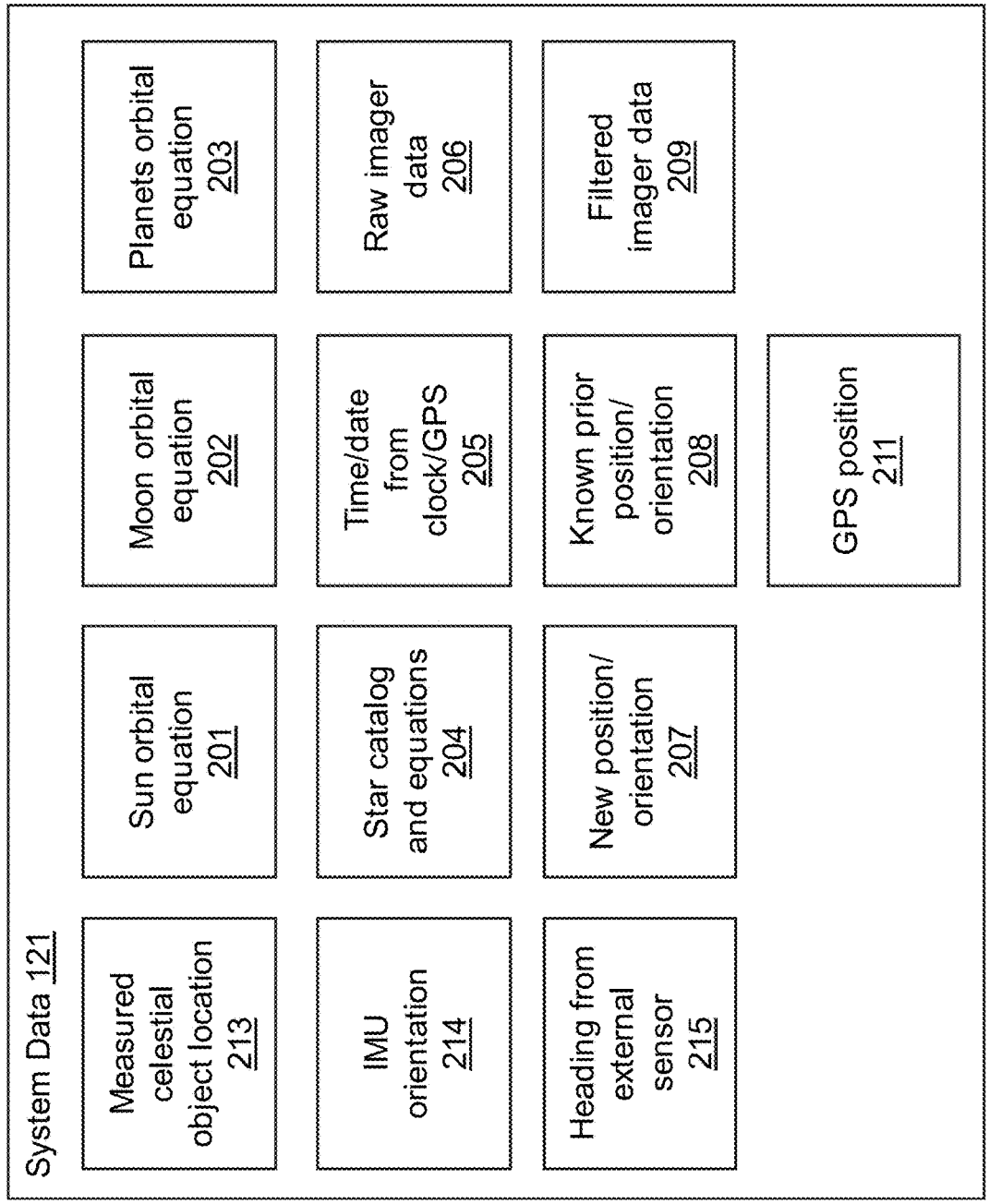
FIG. 5 depicts exemplary system data of FIG. 2.
Figure 7:
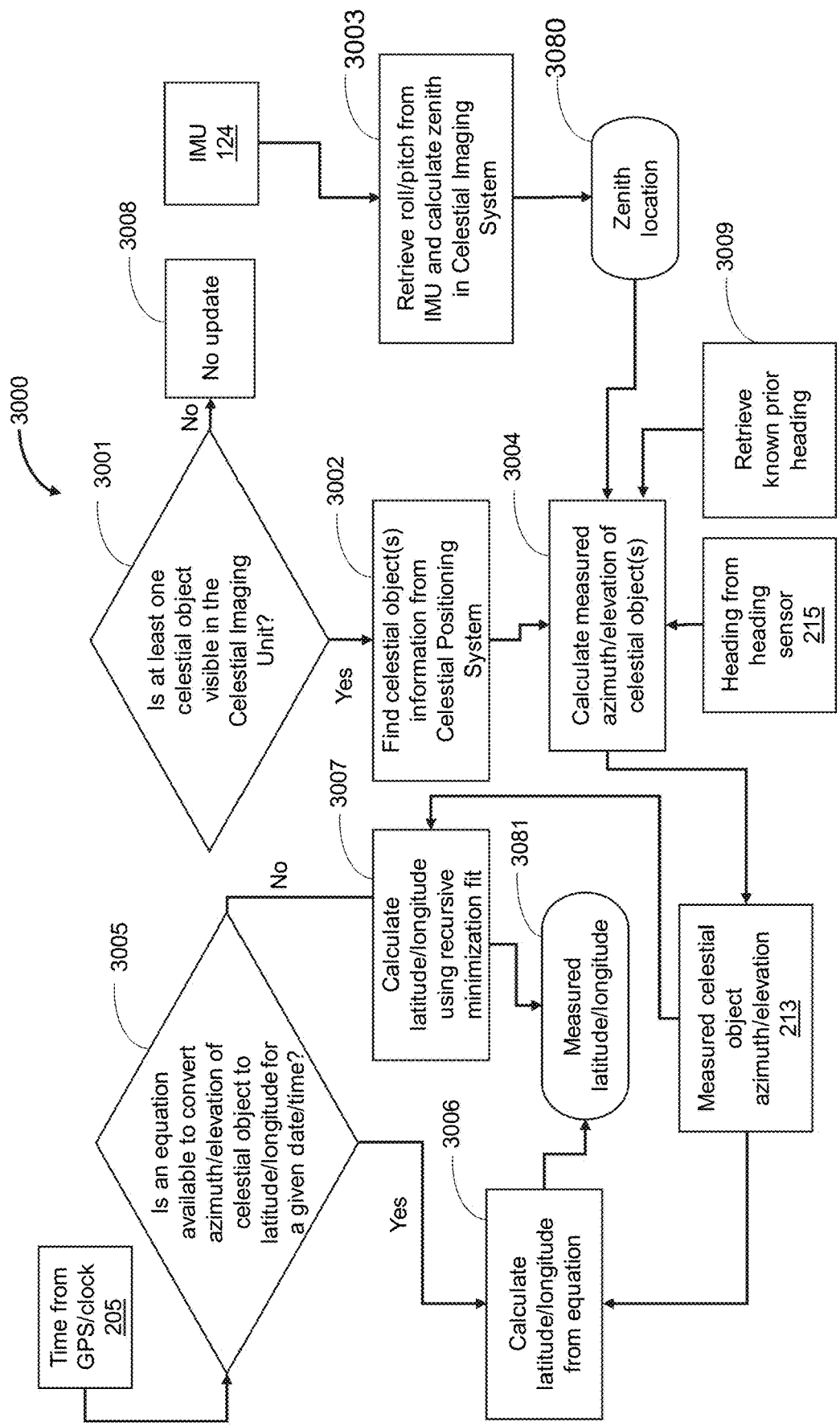
FIG. 7 depicts an exemplary method for calculating measured latitude and longitude using the celestial imaging unit, roll/pitch, and time/date.

Exemplary system data 121 is depicted in FIG. 5 and comprises:

a. A "Sun orbital equation" 201, which is the physics that describes the mechanics of the Sun with respect to the Earth. The Sun orbital equation is implemented as an equation stored in memory 1123 or a lookup table.

b. A "Moon orbital equation" 202, which is the physics that describes the mechanics of the Moon with respect to the Earth. The Moon orbital equation is implemented as an equation stored in memory 1123 or a lookup table.

c. A "Planets orbital equation" 203, which is the physics that describes the mechanics of the other planets with respect to the Earth. The Planets orbital equation is implemented as an equation stored in memory 1123 or a lookup table.

d. A "Star catalog and equations" 204, which is a catalog of known star positions and equations in the sky. These equations describe the physics of the stars' motion with respect to the Earth, implemented as an equation or lookup table stored in memory 1123.

e. "Time/date from clock/GPS" 205, which is current time and date information from either the GPS 125 or the clock 123.

f. "Raw imager data" 206, which is raw image data from the imager 1126 (FIG. 2).

g. "New position/orientation" 207 (FIG. 3), which is the Kalman-filtered position/orientation after step 1008 of the method 1000 (FIG. 3).

h. "Known prior position/orientation" 208 (FIG. 3), which is the position/orientation from prior timestep, obtained from the method 1000 (FIG. 3).

i. "Filtered imager data" 209, which is the data that has been filtered per step 1002 of the method 1000 (FIG. 3).

j. "GPS position" 211, which is the prior position obtained from the GPS 125 (FIG. 1) and used in step 1030 of method 1088 (FIG. 4).

k. Measured celestial object locations 213, which are the azimuth and elevation of the celestial bodies measured with the celestial imaging unit 110, calculated in step 3003 of the method 3000 (FIG. 7).

l. "IMU orientation" 211, which is the orientation obtained from the IMU 124 (FIG. 1) and used in step 1033 of the method 1088 (FIG. 4) and in step 3004 of the method 3000 (FIG. 7).

m. "Current expected Sun azimuth/elevation" 212, which is the expected Sun position calculated using the Sun orbital equation" 201 and the output of step 1018.

n. "Heading from heading sensor" 215, which is the heading obtained from the heading sensor 122 (FIG. 1).

The image processing logic 120 executes the processes described herein with respect to FIGS. 3, 4, 9a, 9b and 9c.

Referring to FIG. 2, an external interface device 126 connects to and communicates with the navigation/localization applications 103. The external interface device 126 may also communicate with or comprise an input device, for example, a keyboard, a switch, a mouse, and/or other type of interface, which can be used to input data from a user of the system 100. The external interface device 126 may also communicate with or comprise a display device (not shown) that can be used to display data to the user. The external interface device 126 may also or alternatively communicate with or comprise a personal digital assistant (PDA), computer tablet device, laptop, portable or non-portable computer, cellular or mobile phone, or the like. The external interface device may also or alternatively communicate with or comprise a non-personal computer, e.g., a server, embedded computer, FPGA, microprocessor, or the like.

The external interface device 126, GPS 125, IMU 124, heading sensor 122, and clock 123 are shown as part of the signal processing unit 107 in the exemplary embodiment of FIG. 2. In other embodiments, the external interface device 126, GPS 125, IMU 124, heading sensor 122, and/or clock 123 may be outside of the signal processing unit and/or part of the navigation/localization applications 103.

FIG. 3 is a flowchart depicting exemplary architecture and functionality of the image processing logic 120 (FIG. 2) run in the signal processing unit in accordance with a method 1000. In step 1001 of the method 1000, the celestial imaging unit 110 records images of the sky 154 (FIG. 1) and sends raw image data to the signal processing unit 107 (FIG. 1).

In step 1002, the signal processing unit 107 (FIG. 1) corrects imager non-uniformity of the images received from the celestial imaging unit 110. Examples of imager non-uniformity include fixed pattern lines in the image, noisy pixels, bright spots, detector non-linearity, spatial distortion, and the like. Algorithms that are known in the art may be used for correcting the imager non-uniformity. In some embodiments, step 1002 is not performed because the imager non-uniformity does not require correction.

In other embodiments, a frame averaging step (not shown) is performed between step 1001 and 1002 to improve signal-to-noise ratio and thereby improve the accuracy of the system.

In step 1003, the signal processing unit 107 removes image distortion from the image data. An example of image distortion is warping at the edges of the image caused by the objective imaging lens system. Algorithms that are known in the art may be used for correcting image distortion. In some embodiments, step 1003 is not performed.

Figure 8:
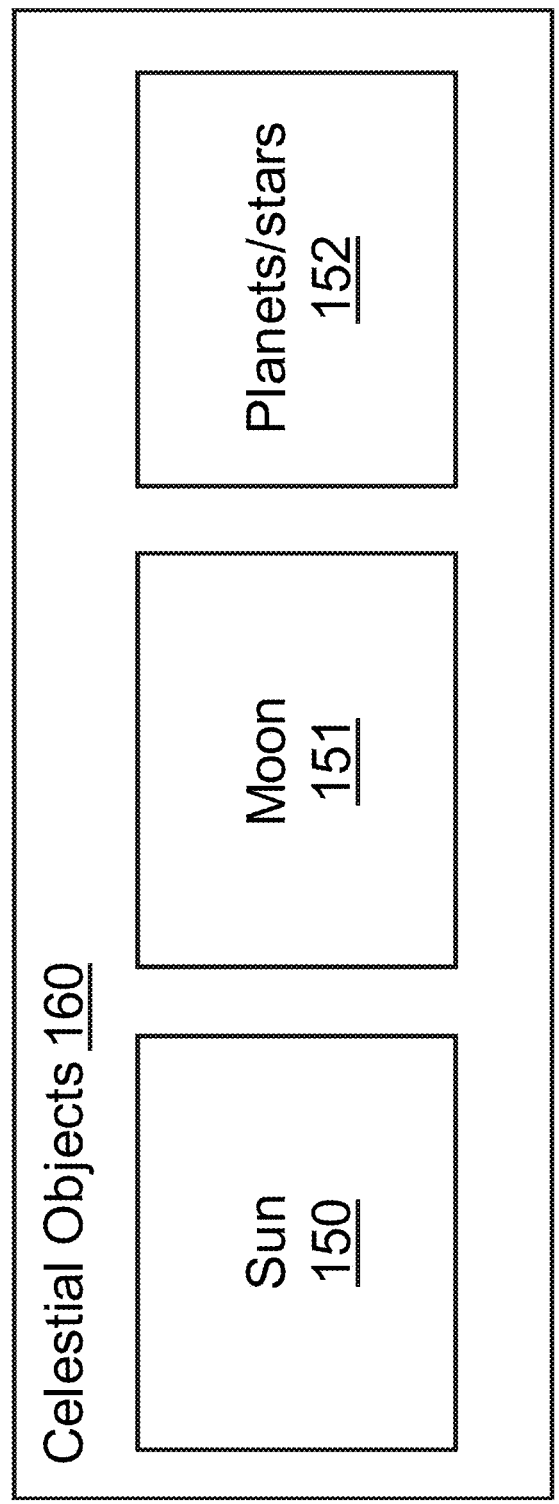
FIG. 8 depicts celestial objects of FIG. 1.

In step 1004, the signal processing unit 107 determines the relative position of the celestial objects 160 (FIG. 8) in the celestial imaging system 110 (FIG. 1). This may include one or more of the following; pixel x/y location of object center, translated azimuth/elevation of the object center, intensity of the celestial object, angle of polarization (AoP) of the object, or degree of linear polarization (DoLP) of the object.

In some embodiments, the method 1000 "splits" into independent optical channels, each to detect a different celestial imaging unit 110 to detect different celestial bodies.

In some embodiments, an image registration step (not shown) is performed to spatially register the independent images of the celestial imaging unit 110 (FIG. 1) with each other. Such an image registration step is not required if a mechanical registration is sufficient.

In step 1005, the signal processing unit 107 retrieves time data from clock/GPS 205 (FIG. 5) and obtains known prior position/orientation data 208, combined with celestial body models to find the true celestial body positions relative to the celestial imaging unit 110. The celestial body models may include the Sun orbital equation 201 (FIG. 5), the Moon orbital equation 202, the planets orbital equation 203, or a star catalog an equations 204.

In step 1006, the signal processing unit 107 compares the true celestial object positions calculated in step 1005 to the measured celestial object positions calculated in step 1004. A close match between the measured and true celestial objects positions in the celestial imaging unit 110 informs that the prior position/orientation data 208 is accurate. The prior position/orientation data can be modified in a way to search for a more accurate answer.

In step 1007, the signal processing unit 107 uses the position from the best matched prior position/orientation data to determine the current measurements position (latitude/longitude). In some embodiments, the position may be relative to a different frame of reference than latitude/longitude.

In step 1008, the signal processing unit 107 uses a Kalman filter or variants to fuse the prior position/orientation 208 with the new measured position from step 1007 to determine a new position/orientation 207 using methods known in the art. In some embodiments a different type of filter may be used, such as an extended Kalman filter, temporal averaging, etc.

FIG. 4 depicts an exemplary method 1088 for the step 1008 for gathering the latest known position/orientation data. In step 1030, the signal processing unit 107 checks to see if current latitude and longitude information is available from GPS 125 (FIG. 1). If current latitude and longitude information is available, then in step 1031, the signal processing unit 107 obtains that data. If current latitude and longitude information is not available from GPS 125, then in step 1034 the signal processing unit 107 can use a seed value or prior position data for the localization analysis. In this regard, there may be prior GPS data available, and if not, the user could input his last known location.

In step 1032, the signal processing unit 107 checks to see if current roll and pitch information is available from an IMU 124 (FIG. 1). If current roll and pitch information is available, then in step 1033, the signal processing unit 107 obtains that data. If current roll and pitch information is not available from IMU 124, then in step 1034 the signal processing unit 107 can use a seed value or prior orientation data for the analysis. In this regard, there may be prior IMU orientation data available, and if not, the user could input his last known orientation. As a result of the process 1088, the signal processing unit 107 will have obtained the latest known position/orientation data 1035.

FIG. 7 depicts an exemplary method 3000 for the steps 1005, 1006, and 1007 (FIG. 3) in the method 1000. In step 3001, the signal processing unit 107 determines if at least one celestial object 160 is visible or detectable in the celestial imaging system 110. If a celestial object is not detected, then in step 3008, the measured latitude/longitude 3081 is not updated. If a celestial object is detected, step 3002 describes finding the centroid of the celestial object. In some embodiments, the celestial object information includes the centroid position of the body in the celestial imaging system. In other embodiments, the celestial object includes the angle and degree of polarization of the sky.

In step 3003, the signal processing unit 107 retrieves the roll/pitch from an IMU 124 and calculates the zenith location 3080 for the celestial imaging system 110.

In step 3004, the signal processing unit 107 calculates the measured azimuth/elevation of the celestial object 213 relative to the zenith 3080. In some embodiments, the azimuth/elevation of the Sun 150 may be determined using the AoP and DoLP of the sky at the zenith 153.

In step 3005, the signal processing unit 107 determines if an equation is available to convert the azimuth/elevation of a celestial object to latitude/longitude for a given date/time combination. If there is an equation, then step 3006 calculates the measured latitude and longitude 3081 using the equation and the measured celestial object location 213. If there is not an equation, then the measured latitude and longitude 3081 is calculated using a recursive minimization fit in step 3007.

Figure 9A:
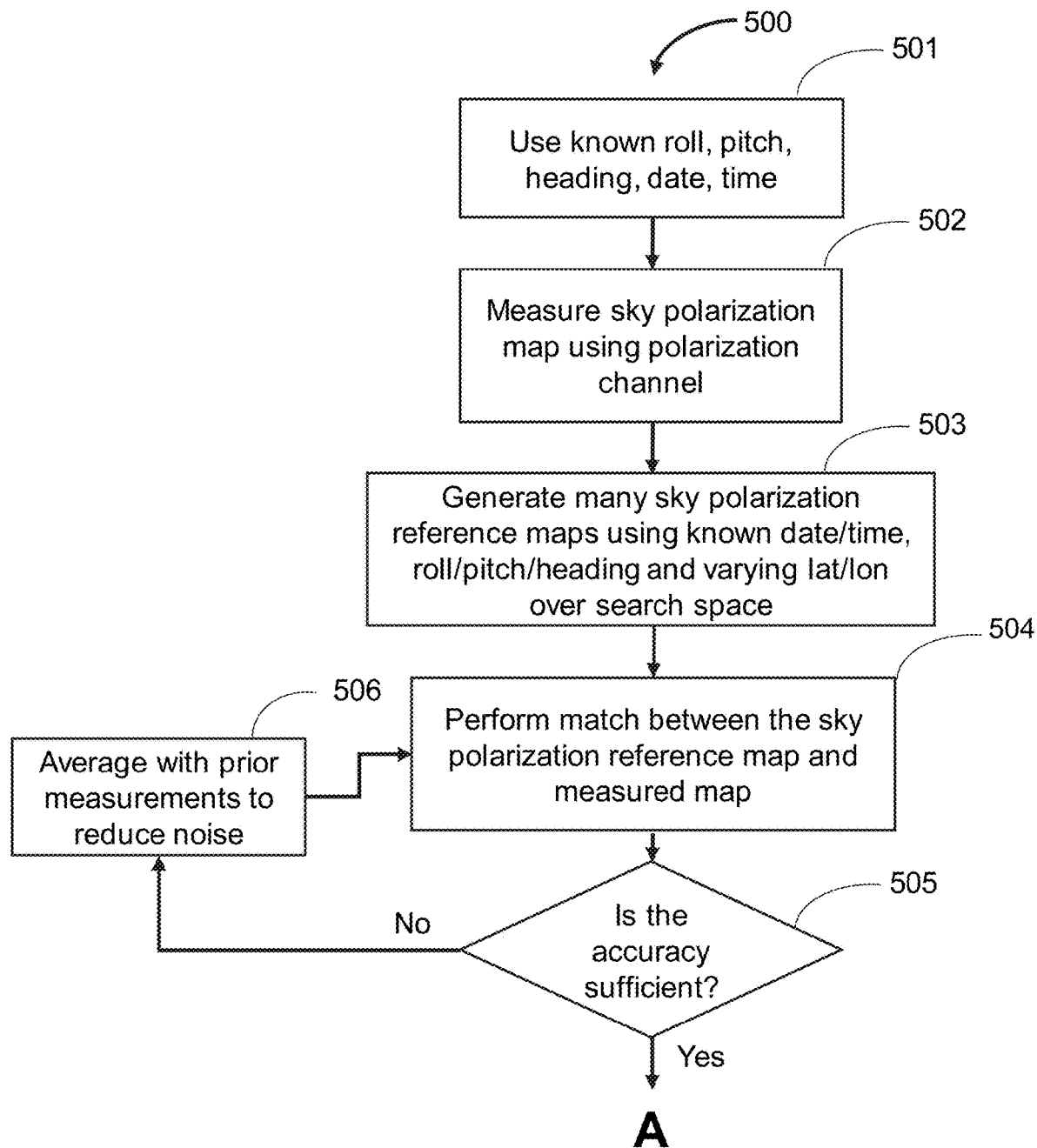
FIGS. 9a-9c depict exemplary steps in a method for calculating latitude/longitude from a celestial body or the sky polarization map.
Figure 9B:
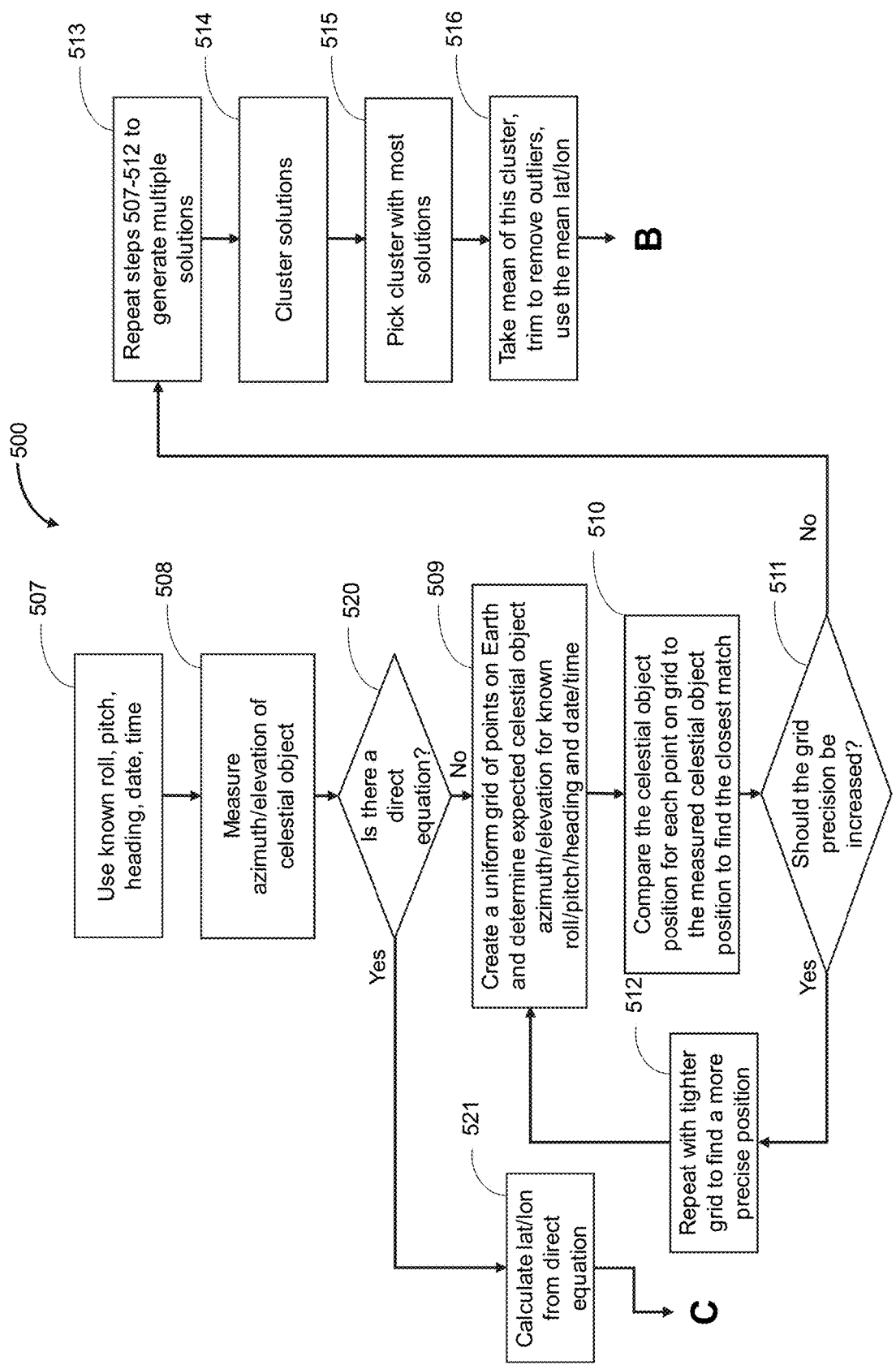
Figure 9C:
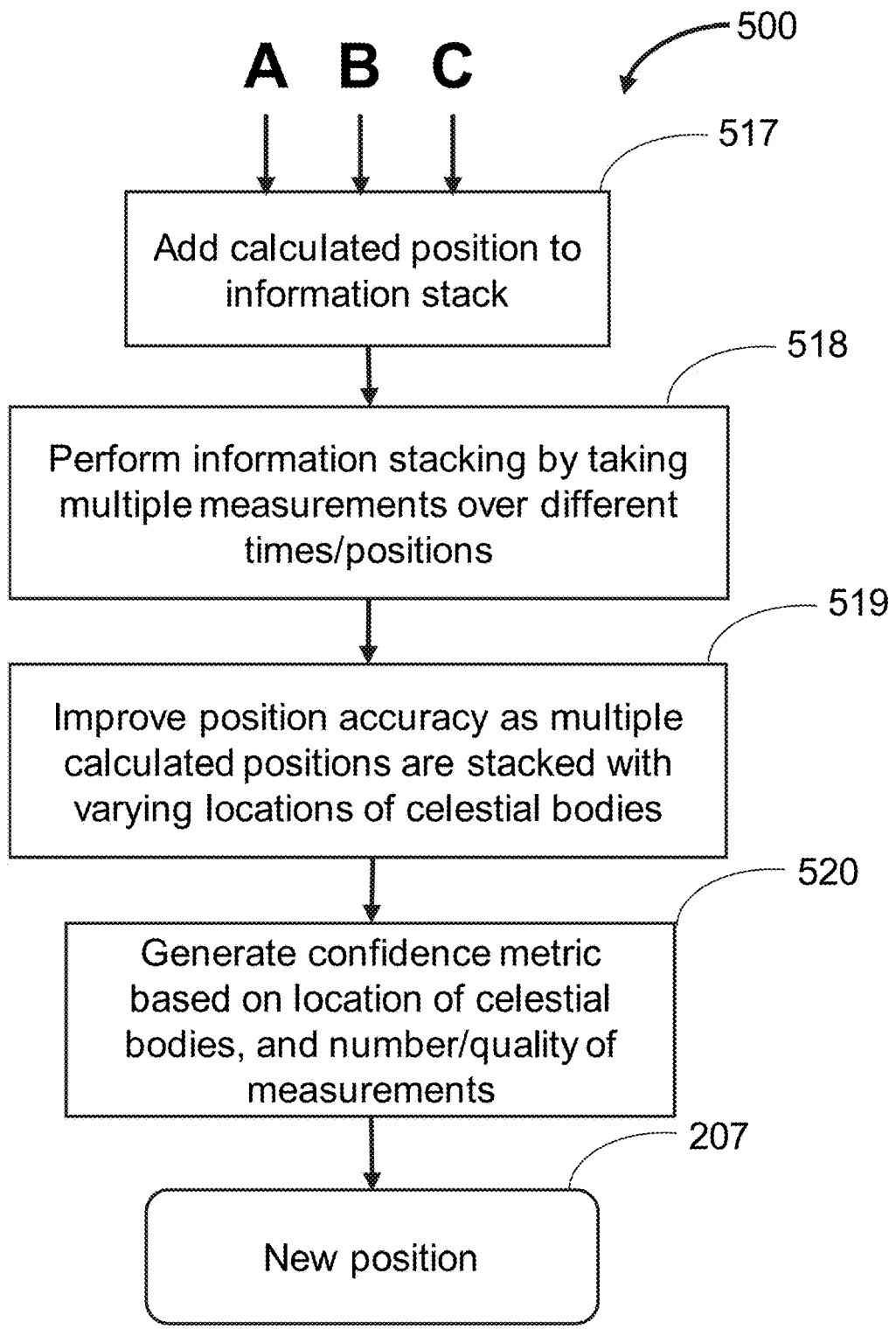

FIGS. 9*a-c* depict an exemplary method 500 for the step 3007 in FIG. 7. In step 501, the known roll, pitch, heading, date, time are retrieved.

In step 502, the signal processing unit 107 measures the sky polarization map using the polarization channel of the celestial imaging unit 110.

In step 503, the signal processing unit 107 generates multiple sky polarization reference maps using the known date, time, roll, pitch, and heading from step 501, but varying the latitude/longitude input over multiple locations to create a search space. In some embodiments, this search space will form an evenly distributed grid. In other embodiments, this search space may be sparse or dense.

In step 504, the signal processing unit 107 performs a match between the sky polarization reference map and the measured polarization map using methods known in the art. In some embodiments, this match may be performed by evaluating which maps are the most similar.

In step 505, the signal processing unit 107 decides whether the accuracy of the match is sufficient or not. The accuracy may be determined using the quality of the match, the quality of the input map, the input parameters (roll, pitch, heading, time, date), and/or the number of matches. The decision may be based on a threshold or another equation which decides whether the match is sufficient. If the accuracy is sufficient, the process continues to A. If the accuracy is not sufficient, step 506 describes a new measurement (steps 501-504) is taken and measured with all of the previous measurements. In some embodiments, this averaging step may be performed by a filter which provides more weight to certain past or current measurements based on the filter's confidence of the measurement. The result of this step is called A.

Referring to FIG. 9b, in step 507 of method 500, the known roll, pitch, heading, date, time are retrieved.

In step 508, the signal processing unit 107 measures the position of a celestial object 160 using the celestial positioning system 110.

In step 520, the signal processing unit 107 determines if there is a direct equation to determine latitude/longitude from roll, pitch, heading, date, time, and the azimuth/elevation of the celestial object. If there is a direct equation, the step 521 calculates the latitude and longitude from the direct equation using roll, pitch, heading, date, time, and azimuth/elevation of the celestial object. This latitude and longitude calculated from the direct equation is called C. If there is not a direct equation, then in step 509, the signal processing unit 107 creates a uniform grid of points or guesses on Earth by varying the latitude/longitude using the same input roll, pitch, heading, date, and time. Using this grid of points, the signal processing unit 107 determines the expected celestial object azimuth/elevation for each point in the grid.

In step 510, the signal processing unit 107 determines which point in the grid best matches the measured celestial object using the azimuth/elevation of the object. This can be performed using methods known in the art such as minimization techniques or fitting algorithms. In some embodiments, an additional step is used to filter two minimums based whether the answer is possible (such as the Sun cannot be seen at night).

In step 511, the signal processing unit 107 determines if the grid precision should be increased. If the grid precision should be increased, a new grid can be formed around the minimum point found in step 510. If not, then step 513 describes how to process of steps 507-512 can be repeated to generate multiple independent solutions. The number of independent solutions generated total should be greater than 2, such that clustering can occur.

In step 514, the signal processing unit 107 generates clusters of solutions from step 513 using a k-means, hierarchical, or another method known in the art.

In step 515, the signal processing unit picks the cluster with the most solutions as the best cluster. In some embodiments, multiple clusters may be combined. In other embodiments, the cluster size may not be large enough to be valid.

In step 516, the signal processing unit calculates the mean of the best cluster of latitude and longitude solutions. In some embodiments, this step may remove outliers through trimming prior to calculating the mean. This final value for latitude and longitude is called B.

In FIG. 9c, the continuation of method 500 is shown using the inputs from A, B, and C. In step 517, the calculated position from Step A, B, or C is added to an information stack.

In step 518, the signal processing unit 107 performs information stacking by performing the steps from FIGS. 9a and 9b multiple times, with time changing and/or position changing.

In step 519, the signal processing unit improves the accuracy of the estimated position using multiple measurements of celestial objects that have moved a sufficiently large difference in azimuth and elevation. Part of this step is to take multiple measurements of celestial objects at different times of day from the same location to further refine position and reduce noise. In this case, larger distances in time would correspond to better noise reduction. Another part of this step is to take multiple measurements over a small period of time but traveling a large distance. In this case, the larger distance in position would correspond to better noise reduction, but the relative position change must be accurately known. This can be accomplished using methods known in the art, such as dead reckoning, inertial navigation, or mapping.

In step 520, the signal processing unit 107 generates a confidence metric the predicts the accuracy of the measurement. This confidence metric can be based on the location of the celestial bodies relative to Earth and the celestial imaging unit 110, the number of measurements, or the quality of the measurements. This combined location and confidence metric forms the new position (latitude and longitude) estimate 207.

Fundamentals of Imaging Polarimetry

Polarization of light results from the vector nature of light (as an electromagnetic wave). It is a fundamental, independent quantity so that two beams of light with the same amplitude and wavelength can have very different polarization states.

Polarimetry is simply the measurement of the polarization state of an incident beam of light. In its simplest form, imaging polarimetry can be accomplished by taking two recordings with two different orientations of a linear polarizer. The linear polarizer oriented at some angle, $\theta$, filters the orthogonal state, and if n images are collected for some $\Delta\theta$ (such that $\Delta\theta=\pi/n$, where n is suitably large enough; e.g. n>3), then a sinusoidal modulation will be evident in those regions of the image that are, to some degree, polarized. The degree of polarization, from 0% to 100%, is directly related to the depth of modulation, so that completely unpolarized regions undergo no modulation throughout the rotation of the linear polarizer.

While this description of polarimetry is somewhat intuitive, it is not necessarily helpful or convenient in a quantitative representation of the polarization content of a single pixel of an image or a single light beam. This analysis uses the Stokes vector, first introduced by G. G. Stokes in 1852, in which $$S = \begin{bmatrix} S_0 \\ S_1 \\ S_2 \\ S_3 \end{bmatrix} = \begin{bmatrix} \langle |E_x|^2 + |E_y|^2 \rangle \\ \langle |E_x|^2 - |E_y|^2 \rangle \\ 2\text{Re}\langle E_x E_y^* \rangle \\ -2\text{Im}\langle E_x E_y^* \rangle \end{bmatrix} \propto \begin{bmatrix} I_0 + I_{90} \\ I_0 - I_{90} \\ I_{45} - I_{135} \\ I_L - I_R \end{bmatrix}, \quad (1)$$

where $E_x$ and $E_y$ are the component electric field amplitudes and I is the radiance collected by the camera equipped with a polarizer at the appropriate orientation. The first two components of the Stokes vector ($S_0$ and $S_1$) are measured using a linear polarizer orientated at 0° and 90° (horizontal and vertical). The subscripts of I in Equation 1 for $S_0$ and $S_1$ correspond to the orientation of the linear polarizer. The $S_0$ component is found by summing the two intensity measurements and is exactly equal to the standard radiance image from a "normal" camera. The $S_1$ component is determined by subtracting the two intensity measurements and is therefore referred to as the degree of horizontal polarization. Similarly, $S_2$ is the degree of 45° polarization. The $I_L$ and $I_R$ refer to the radiance collected by the camera if it were equipped with left and right circular polarizers, so $S_3$ is called the degree of circular polarization.

With the Stokes vector defined, two important components derive directly from the Stokes vector and are used: the degree of linear polarization (DoLP) and the angle of polarization (AoP). The DoLP represents the percentage of light that is linearly polarized, such that $$DoLP = \frac{\sqrt{s_1^2 + s_2^2}}{s_0}. \quad (2)$$

Additionally, the AoP, also called the polarization orientation, represents the dominant orientation of linearly polarized light, defined as $$AoP = \frac{1}{2} \times \tan^{-1}\left(\frac{s_2}{s_1}\right). \quad (3)$$

Rayleigh Scattering Theory

Within the atmosphere, Rayleigh scattering of light causes a defined polarization pattern, which is dependent on the celestial position of the Sun or moon and the observer's relative position and pointing direction (or orientation). The majority of this scattering occurs by air molecules (specifically nitrogen and oxygen) in the stratosphere at roughly 30 km above sea level. The polarization state of this scattered light is described using the previously defined Stokes vector (Equation 1) and its components, where $S_0$ represents the overall intensity (radiance), DoLP represents the percentage of light that is linearly polarized (Equation 2), and AoP represents the orientation angle of the linearly polarized light (Equation 3).

It is important to note that the light that is scattered at an angle of 90° from an unpolarized light source (e.g., the Sun or the moon) will be highly linearly polarized. Likewise, light that is scattered at an angle of 0° will be unpolarized. Therefore, the polarization pattern of the sky is primarily dependent on the angle formed between the observer, the scattering position (i.e., the target point in the sky), and the light source (which can be the Sun or moon). Since the scattering plane is static, and assuming the observer is stationary, the polarization pattern will depend on the celestial position of the Sun or moon and the latitude and longitude of the sensor. The key point is that the celestial position of the Sun/moon can be used for navigational purposes; therefore, a map which describes the position of the Sun/moon relative to the observer and relative to a fixed scattering plane can provide a wealth of information to help deduce the observer's position or heading.

Since the Rayleigh scattering effect is based on a number of variables, the observed sky polarization pattern changes based on the date/time and the latitude, longitude, and orientation of the sensor. Therefore, three of these parameters (sensor latitude and longitude or sensor heading) can be predicted as long as the date/time is known, roll/pitch, and a sufficient number of distinct polarization measurements of the sky are made. If heading is known, then latitude and longitude can be calculated. If latitude and longitude are known then heading can be calculated. This would allow for absolute positioning simply based on multiple distinct views of the sky or a single, large field of view (FOV) image. If position is also known, heading can be calculated. Also, if heading is known, position can be calculated.

Note that additionally, while intensity and DoLP are affected by clouds and other atmospheric conditions that partially depolarize the light, the AoP often does not change in these conditions; this is because it relates only to the residual polarized light which has transmitted through the cloud, not the light scattered by the cloud which is unpolarized. The important point is that the AoP pattern of the sky typically sustains despite the presence of intervening clouds, and any unscattered transmitted light will retain the orientation information required to localize the sensor. While this may represent a small fraction of the light incident onto the clouds, potentially leading to low signal-to-noise ratio (SNR) problems, it nonetheless contains exactly the information needed to determine the sensor's heading or position.

Transformation to Scanning Polarimeter Coordinate System

There are two general ways to measure the angle of polarization (AoP) of the sky: using a scanning polarimeter where the sky polarization sensor sequentially measures each discrete point in the sky by pointing directly towards it; and using a fixed polarimeter where the focal plane array (FPA) is fixed and each discrete point in the sky enters the optical system with a different angle simultaneously. The system of the present disclosure uses a fixed polarimeter; however, the representation of the polarization pattern generated by a scanning polarimeter is useful for navigational purposes due to the appearance features from which latitude, longitude, and yaw can be extracted. Incidentally, the measured polarization patterns differ because the scanning polarimeter has an associated changing coordinate system that changes with each target position while the FPA-based measurement has a single common coordinate system for each pixel. Therefore, a method to transform the polarization map measured by a fixed polarimeter to a map that would be measured by a scanning polarimeter was developed. Note that both polarization maps represent the same data measured using different methods and presented in different coordinate systems.

Figure 6:
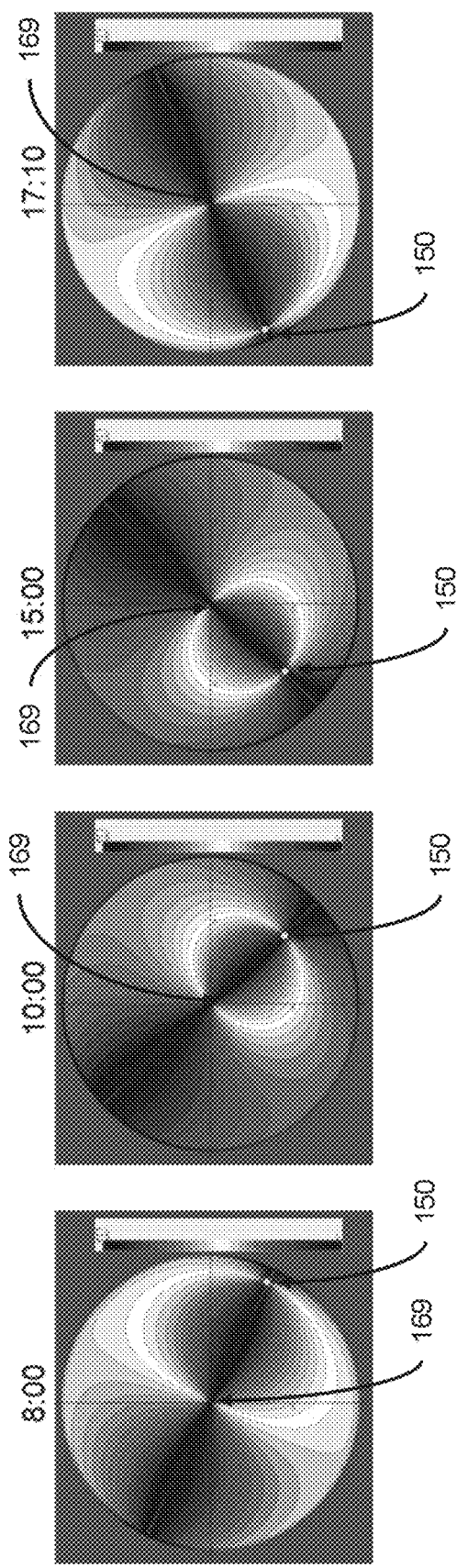
FIG. 6 depicts exemplary sky polarization AoP maps at four different times of the day.

FIG. 6 depicts the results of the platform coordinate transform. Specifically, FIG. 6 depicts exemplary fixed polarimeter AoP maps at four (4) different times of the day. A coordinate transform based on the known relationship between the coordinate systems was used to convert from the fixed polarimeter maps to the scanning polarimeter maps of FIG. 6. The figures depict polar plot projections where radius represents altitude, angle represents azimuth, and the yellow disk represents the Sun 150.

The AoP of 0° and 180° indicates alignment to the imager's x-axis; ±90° both indicate alignment along the imager's y-axis. The data illustrated is representative of a Huntsville, Ala. sensor on Oct. 31, 2012. The sky is assumed to be cloudless and the collected light derived from single scattering (Rayleigh) phenomena in the atmosphere. Light, patchy clouds will not drastically affect the pattern making the single scattering assumption a simplification that is applicable to many measurement situations.

The FIG. 6 AoP maps show AoP in scanning polarimeter coordinates. Note the appearance of a discernible line feature in the scanning AoP plots across the sky connecting the Sun 150 and the center node 169, being the node at the center of the map where the axes cross. In the case where the sensor is level, this center node is also the zenith, defined as the point in the sky or celestial sphere directly above the observer. Similarly, convergence points located at this center point and the Sun can be used to determine useful navigation data as described below.

Finding the Sun Position Using Sky Polarization

The transformed AoP maps in FIG. 6 and the observation of multiple line and nodal features indicate the position of the Sun 150. The relationship between the Sun position and the zenith (measured by an IMU 124) can be used to determine the measured Sun elevation. The relationship between the Sun position and the vertical axis of the imager 1126 can be used to determine the measure Sun azimuth. This method presumes the imager and platform coordinate systems are aligned (e.g., the platform forward direction is the sensor's negative y-direction), or that any offset is known, constant, and can therefore be incorporated into the data reduction to determine platform heading or position.

This unique polarization pattern is shown in FIG. 6 and is primarily dependent on the angle formed between the observer (Celestial Imaging Unit 110), the scattering molecule in the sky 154, and the light source (Sun 150 or Moon 151). This scattering angle provides information about the scattering source's position in the sky relative to the observer. This knowledge can be combined with date/time, roll, and pitch to provide a unique solution to solve for either heading (using position) or position (using heading). The key point is that the celestial position of the Sun/Moon can be used for heading or position determination; therefore, a map which describes the position of the Sun/Moon relative to the observer and relative to a fixed scattering plane can provide a wealth of information to help deduce the observer's absolute heading or position parameters.

Introduction to Calculating Platform Latitude and Longitude from Celestial Objects Celestial objects are in a unique position in the sky for a specific date, time, roll, pitch, and heading. Thus, using knowledge of these parameters, a method is described to determine position (latitude and longitude). First, we start with the following assumptions:

Assume we make a perfect measurement of the sky to ascertain celestial object elevation Assume we make a perfect measurement of the sky to ascertain celestial object azimuth Assume we know date/time to a precise value Assume we know altitude to a precise value The celestial object is the Sun 150 (any celestial object which is accurately measurable from Earth and has a known location relative to Earth position can be used, including the Moon 151, or planets/stars 152)

Figure 10:
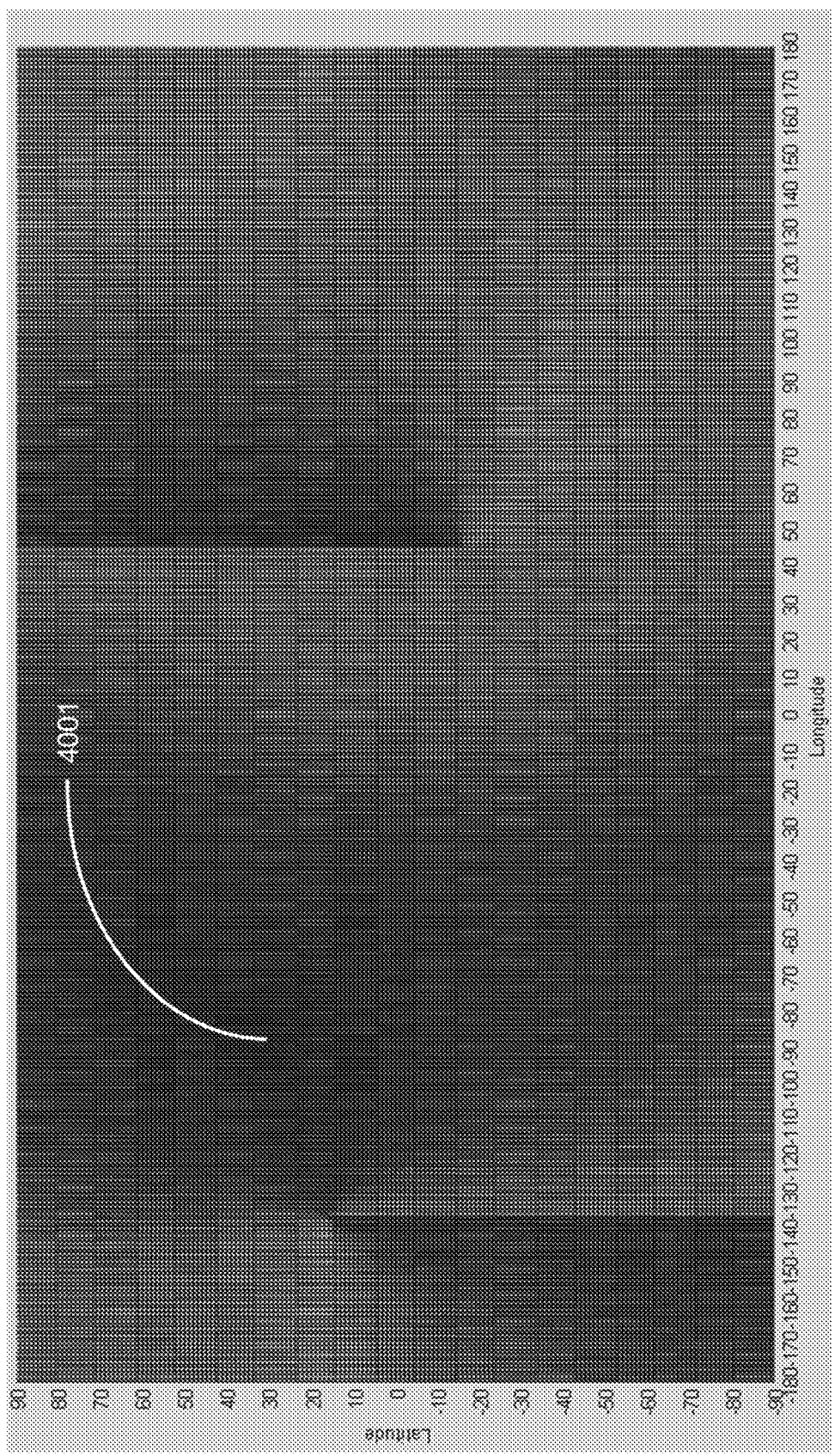
FIG. 10 depicts solving for position using sun azimuth and elevation.

From these assumptions, one can implement a search for the best latitude/longitude to minimize the 2-norm of both sun elevation and sun azimuth. The starting position tested in this example was +34.7304, −86.5861. Using both sun elevation and azimuth, a search method can be used to find a latitude/longitude of +34.73043, −86.58611, for an error of 11.2 m. FIG. 10 shows the search space over the entire Earth using both sun azimuth and elevation. The search function encompasses a minimization technique known in the art, where the global minimum point is shown at 4001.

Figure 11:
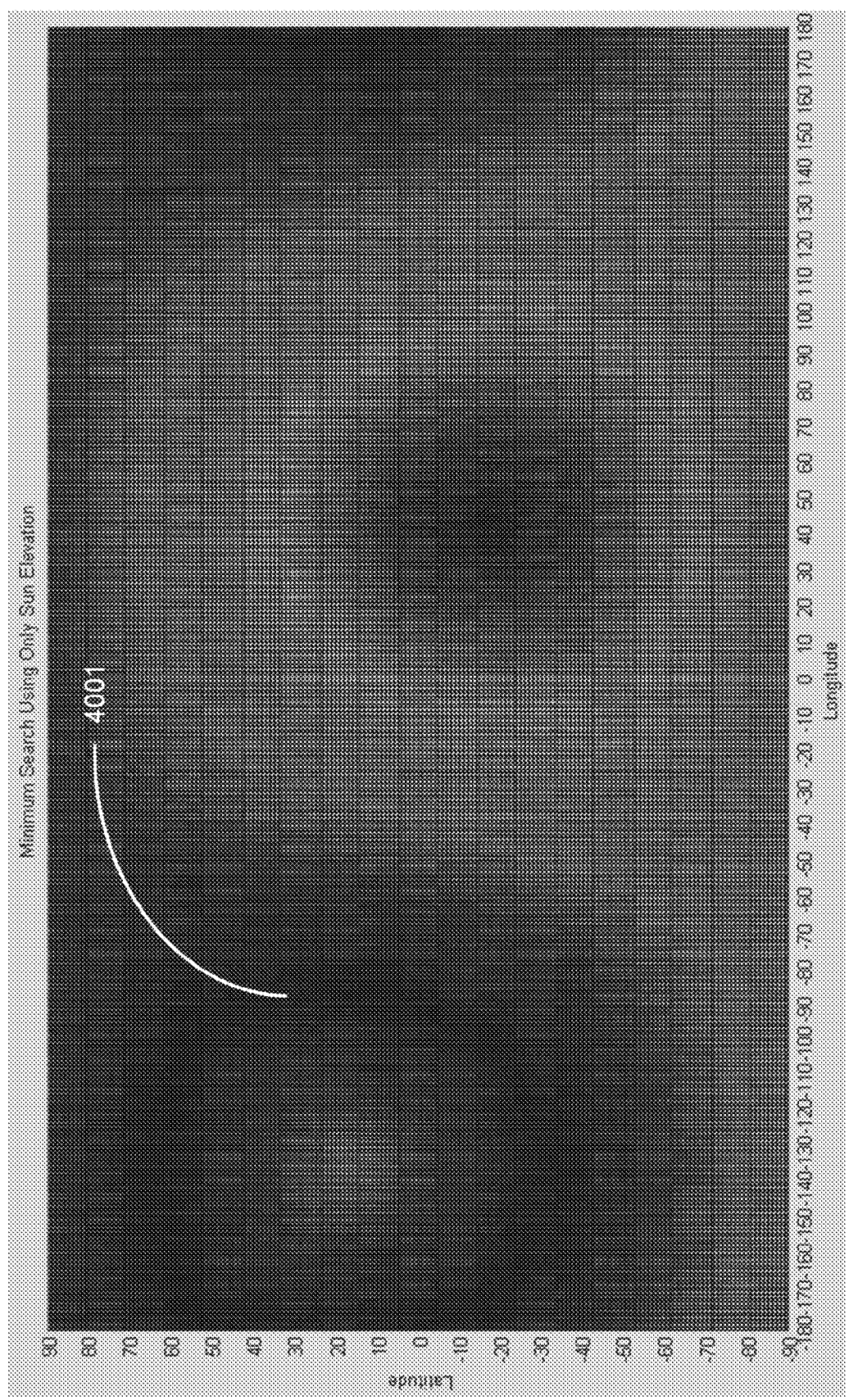
FIG. 11 depicts the non-unique solution problem with solving for position using only sun elevation.

Next, the assumptions are changed for the case that sun azimuth is not measured, only sun elevation. Date/time and altitude were still known. This represents the case where heading is not measured or known. All knowns are assumed to have been measured with zero error as in the prior paragraph. FIG. 11 shows the results from using only the sun elevation. In this case, there is a large ring of minimum values caused by redundancy, whereas the actual truth is 4001. Thus, either sun azimuth or another measurement method is needed to precisely calculate position.

Method for Determining Platform Latitude and Longitude Using Measured Celestial Object The method for calculating platform latitude/longitude using the measured position of a celestial object 160 begins with known inputs. First, date/time must be known. Second, the celestial object is assumed to be in the field of view (FOV) of the Celestial Imaging Unit 110. Third, the roll/pitch are provided by an IMU 124. Fourth, heading is known, provided by an heading sensor 122, or internally provided by a previous measurement.

The noisy measured Sun elevation and azimuth is estimated by IMU roll/pitch errors, heading errors from the heading input source, and errors in the measured azimuth and elevation of the celestial object. Each noise component is a Gaussian and the total noise is sampled from the mixed bivariate distribution. The error due to the roll, pitch, and heading is the main contributor to noise (approx. +/−0.25°). The algorithmic error is in determining the centroid of the celestial object in the Celestial Imaging Unit and is assumed small (approx. +−0.05°).

Using these assumptions, make measurements of the celestial object to determine its azimuth and elevation. The celestial object's azimuth and elevation are found by performing coordinate transforms using the relative position of the object to the Celestial Imaging System and the roll, pitch, and heading of the Celestial Imaging System. This example assumes 300 measurements. Other embodiments may use more or less measurements. Next, solve inverted celestial equations for latitude and longitude. Note this is numerical technique, so guesses must be provided to permit the solving algorithm to converge. For this example, random guesses are used. Other embodiments may use guesses based on prior position information, or a grid of points or "seeds" of varying precision and size (equally spaced latitudes and longitudes across the globe). In some cases, the equation for latitude contains trigonometric functions which makes it multi-valued. Thus, it can have multiple solutions and the one the fit converges upon is dependent on the initial guess. Longitude is linear and therefore always converges to the right answer no matter the initial guess. In some embodiments, an equation may be determined and used which can accurately determine latitude and longitude from the azimuth and elevation of the celestial object for a given roll, pitch, heading, date, time configuration.

Figure 16:
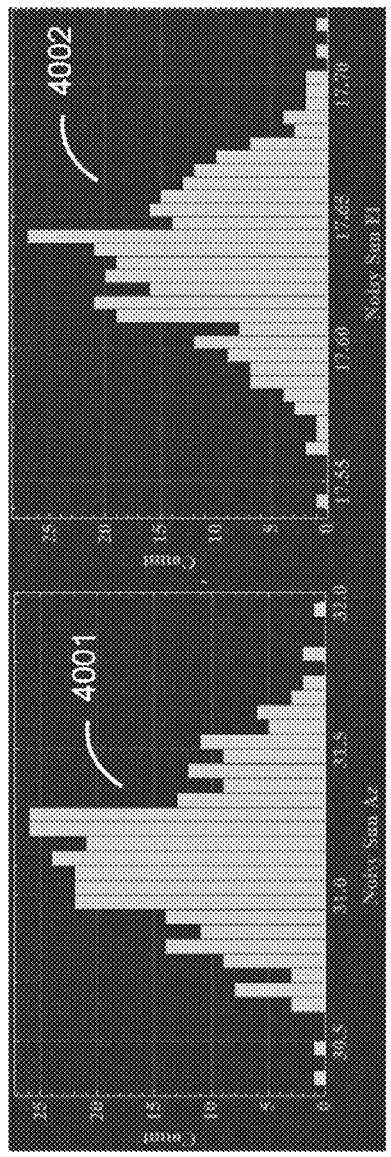
FIG. 16 depicts the clustering and trimming steps of FIG. 9b.
Figure 16:
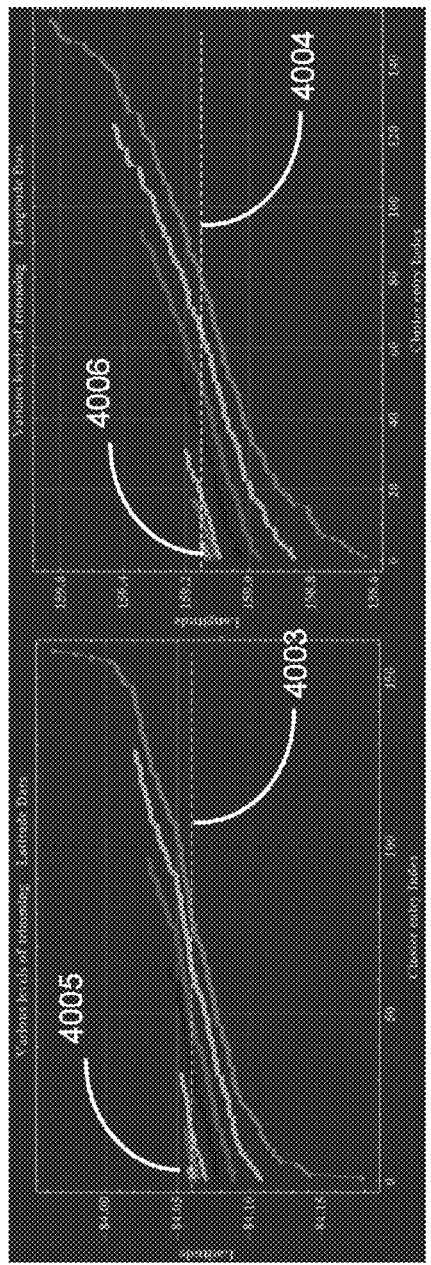

With these multiple solutions (300 in this example), the next step filters the solutions. First, clamp them to the physical range, for instance (−90, 90) for latitude, (0, 360) for longitude. Also, based on the celestial object, it will be known which side of the Earth is not physical (for instance, the Sun is not visible at night). Second, cluster the remaining solution using a method known in the art (e.g., K-means or hierarchal). Third, select the cluster with the most entries—this eliminates the worst solutions. In FIGS. 16, 4001 and 4002 indicate the largest clusters for the latitude and longitude, respectively, for the example described previously.

The next step filters the solutions further by taking the mean of this selected largest cluster. This is depicted for the example in FIG. 16 under column "Mean of Lat Cluster" and "Mean of Long Cluster" for latitude and longitude, respectively. Next, the cluster is trimmed by removing outliers. The threshold for this trimming step can be adjusted. In FIGS. 16, 4003 and 4004 show the means of the latitude and longitude clusters, respectively, calculated in the prior step. Also in FIGS. 16, 4005 and 4006 show the top latitude and longitude clusters that has been trimmed the most in this example.

Studies on Variable Impact on Miss Radius

Figure 17:
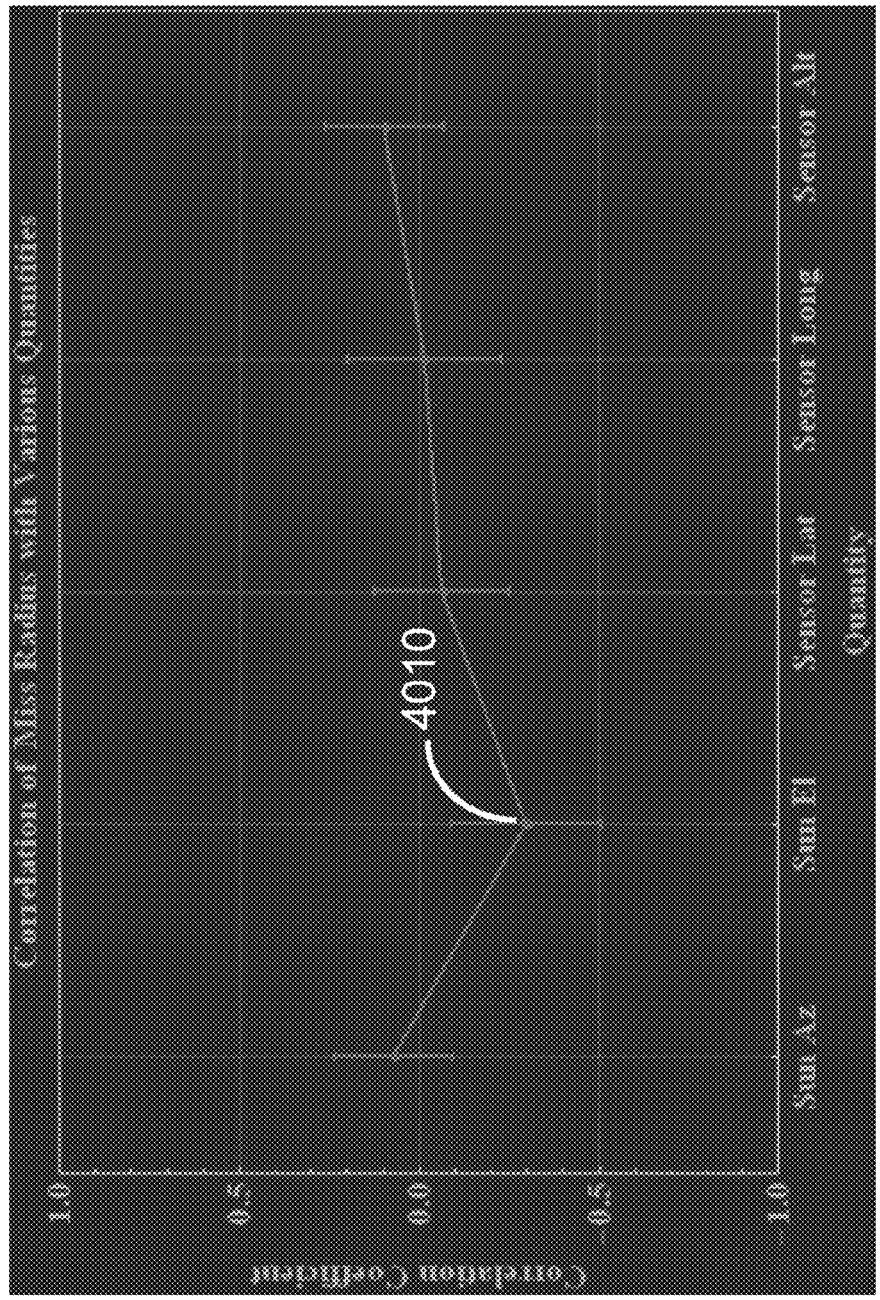
FIG. 17 depicts correlation of position errors with various factors.

A number of studies correlate miss radius to various parameters or variables. The first study included the variables 1) celestial body azimuth, 2) celestial body elevation, 3) latitude, 4) longitude, and 5) altitude. In FIG. 17, the correlation of each of these variables to miss radius is shown. In particular, celestial body azimuth had very little impact, as did latitude and longitude. Altitude also had minimal impact on miss radius or accuracy. The only variable with a statistically significant correlation to accuracy was sun elevation, depicted in 4010 of FIG. 17. This means that the most critical components to the accuracy of the Celestial Positioning System are 1) accurate measurement of the sun elevation in the Celestial Imaging System 110, and 2) accurate roll and pitch from the IMU 124.

Figure 18:
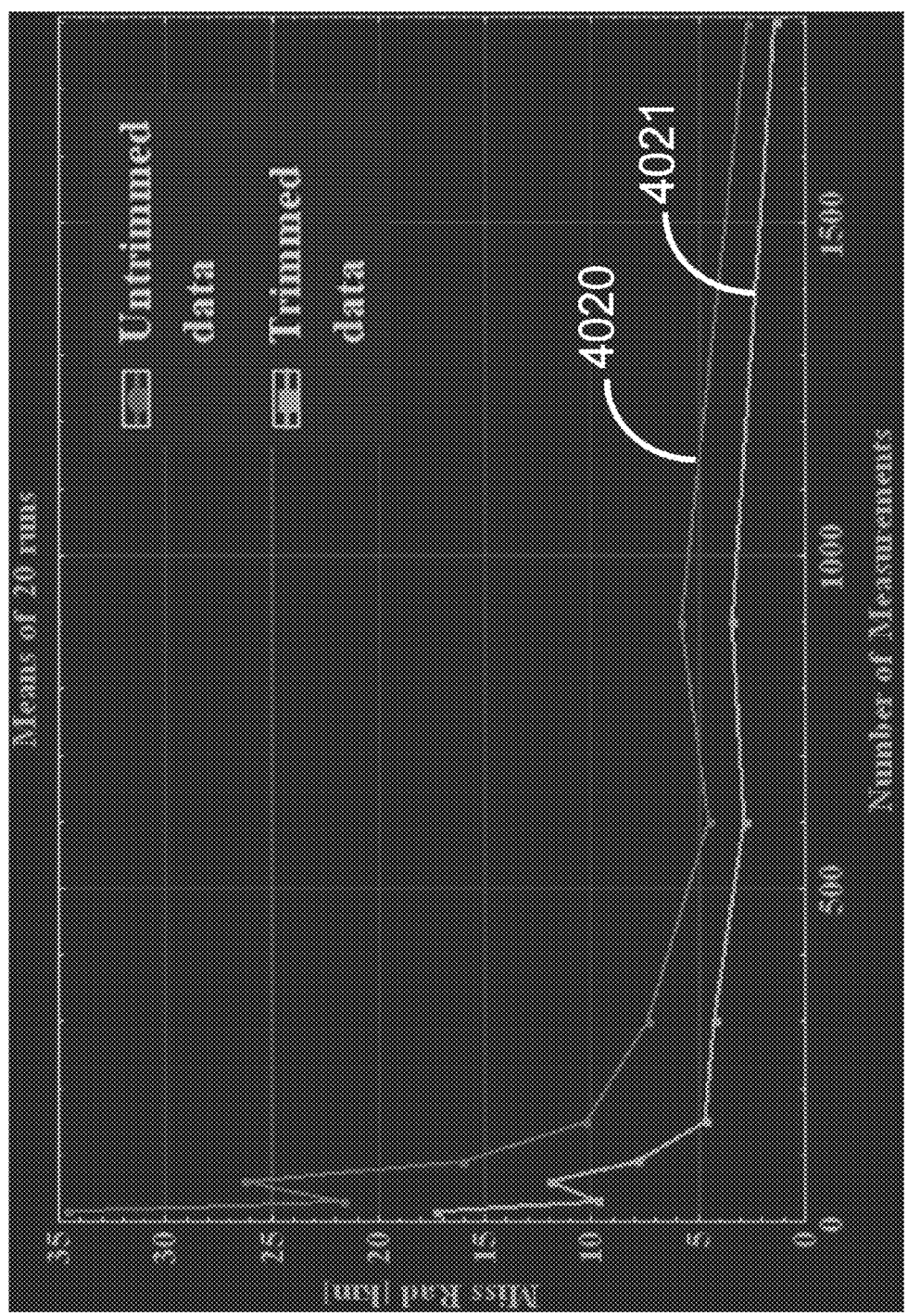
FIG. 18 depicts the position estimate error reducing with number of measurements and trimming and clustered means.

Another study performed analyzed the impact of the number of measurements on miss radius or accuracy. In FIG. 18, 4020 depicts the untrimmed means of 20 runs of the method described in the previous section. Also in FIG. 18, 4021 depicts the trimmed means of 20 runs of this method. The x-axis represents the number of measurements and the y-axis represents miss radius in km. In general, the miss radius for trimmed clusters falls below 5 km around 150 measurements. Additional measurements show slight improvement, but the most improvement occurs in the first 150 measurements.

Figure 19:
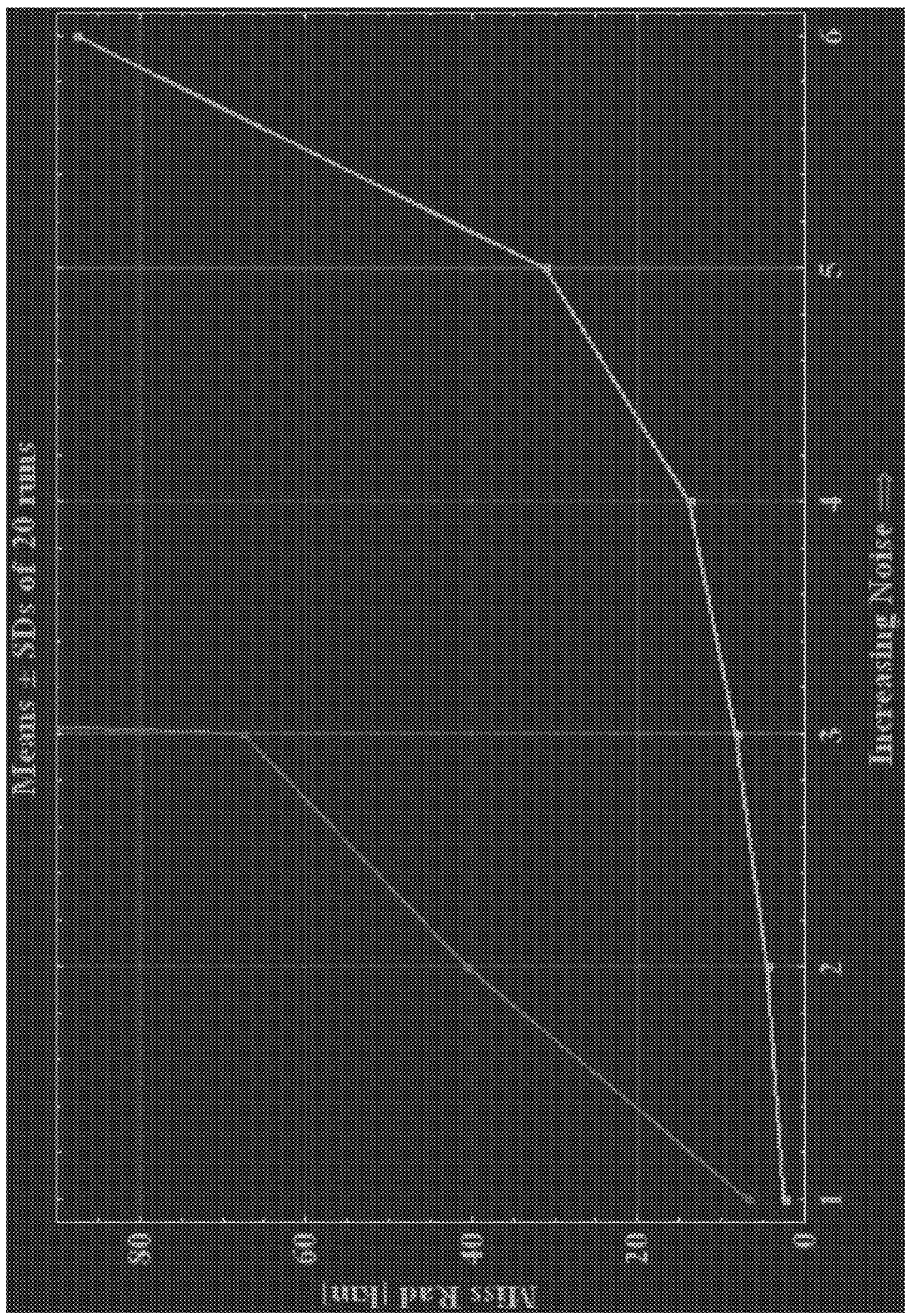
FIG. 19 depicts the position estimate error increasing with roll/pitch/heading noise.

A final study analyzes how noise impacts the accuracy or miss radius. In FIG. 19, the increase noise in the x-axis is represented as follows:

1) Noise level 1 is roll/pitch/heading/algorithm noise of 0.01/0.01/0.25/0.01 in degrees
2) Noise level 2 is roll/pitch/heading/algorithm noise of 0.05/0.05/0.5/0.05 in degrees
3) Noise level 3 is roll/pitch/heading/algorithm noise of 0.1/0.1/0.75/0.1 in degrees
4) Noise level 4 is roll/pitch/heading/algorithm noise of 0.2/0.2/1.5/0.2 in degrees
5) Noise level 5 is roll/pitch/heading/algorithm noise of 0.4/0.4/3.0/0.4 in degrees
6) Noise level 6 is roll/pitch/heading/algorithm noise of 0.75/0.75/4.0/0.75 in degrees In FIG. 19, 4030 depicts the untrimmed data, showing the miss radius error increasing over 90 km by noise level 3. Also in FIG. 19, 4031 depicts the trimmed data, which does not increase beyond 80 km error until noise level 6.

Nighttime Operations

Night time operation in GPS denied environments is highly desirable to ensure that application are not limited to only day time operations. Nighttime necessarily requires different sources for information, but multiple sources are available. First, there is a sky polarization pattern visible at night, typically caused by the Moon (though the Sun contributes around sunrise/sunset). One key point is that measurements of sky polarization made at night typically use large exposure times (up to 15 second exposure). This opens the opportunity that the integration time and optical design can be manipulated to enable dynamic operation at night using sky polarization. If sky polarization proves challenging at night, then the Moon can also provide high accuracy just as tracking of the Sun can be used during the daytime. Additional options include tracking of planets and stars. It should be noted that sky polarization will likely be too noisy in urban environments due to upwelling of artificial light. These other methods (Moon/stars/planets) could still work in urban environments depending to the amount of light pollution.

Regardless of its limitations, nighttime polarization has been demonstrated as an orientation method in the animal kingdom. It is well-known that insects, birds, and crustaceans use daytime polarization as a compass to navigate. However, it has been shown that an African beetle relies on moonlight polarization patterns to roll its dung ball in a straight line. In fact, the dung ball was only rolled in a straight line on nights with the Moon; on nights without the Moon, the beetles wandered randomly. This was considered the first demonstrated example of an animal using the Moon's polarization signature as a compass. However, it was also observed that the dung beetle was not capable of measuring a polarization compass signature on Moon-less nights, an operational limitation of nighttime polarization.

As mentioned earlier, other options exist for nighttime, including Moon tracking, planet tracking, and star tracking. With precise models known in the art for these objects' trajectories relative to Earth, and using a sensor/optics capable of accurately finding the center of these objects, the method described earlier can be applied to make a true 24-hour Celestial Positioning System.

Figure 12:
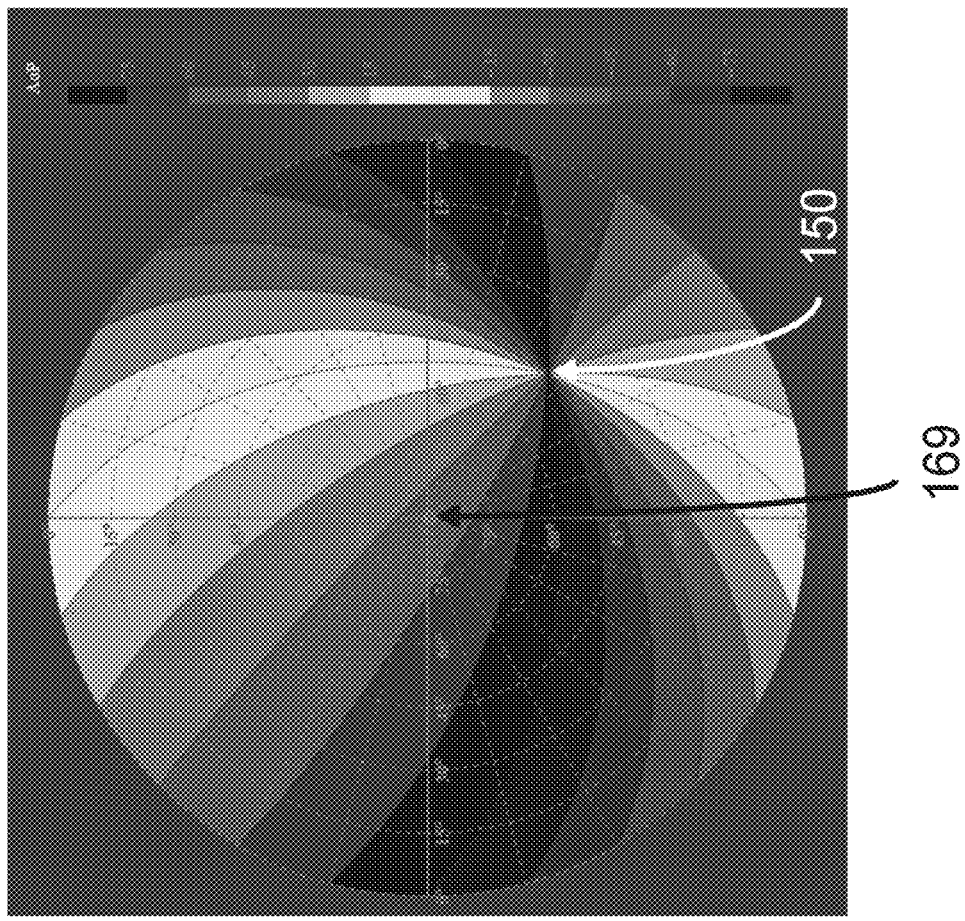
FIG. 12 depicts a full hemispherical calculated sky polarization map with the zenith directly in the center.

Method for Determining Platform Latitude and Longitude Using Sky Polarization Map Another method for finding position involves using the sky polarization map. This method is similar to the previously described method, but the match is performed using imaging mapping techniques known in the art. FIG. 12 shows the AoP map for a full hemispherical view of the sky, where the sensor position (latitude/longitude) is 30 deg. N, 60 deg. W, roll/pitch/heading are all 0 deg., and the date/time are 3/15/16 a 0900 local time. In FIG. 12, 169 indicates the zenith and 150 indicates the Sun. In the figure, the positive x-axis is East and the positive y-axis is North.

Figure 13:
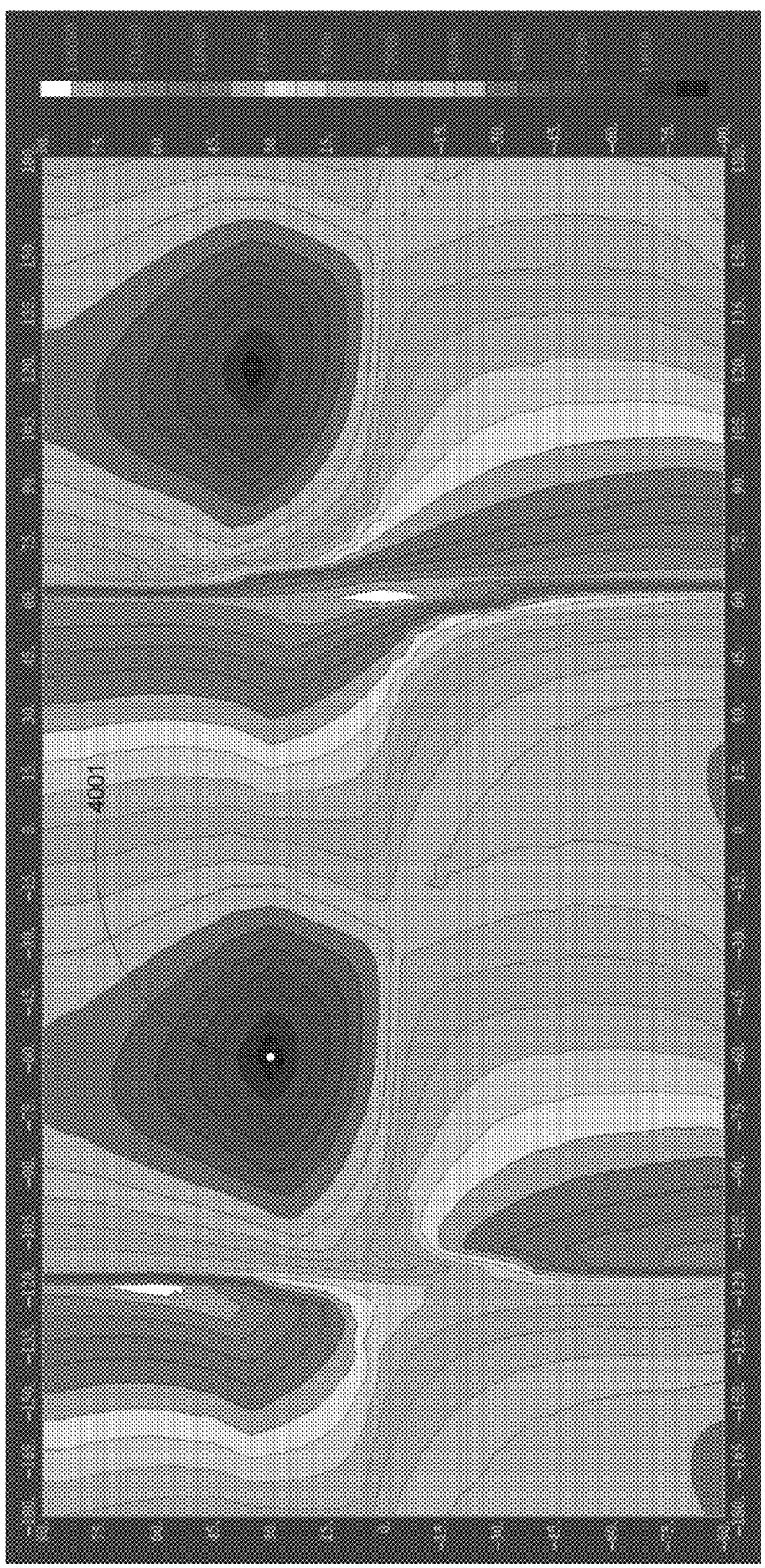
FIG. 13 depicts solving for position using the sky polarization map.

Using the available knowledge of date, time, roll, pitch, and heading, a stack of maps can be generated for each possible latitude/longitude. These possible positions can be derived randomly or in a uniform grid. The number of positions can be small or large, with a starting seed, and in varying precision. After generating the stack of maps, a merit function is applied which compares the measured map to the generated map. This merit function can be any merit function known in the art. FIG. 13 shows a map representing the results of the merit function, where 4001 is the global minimum. The other minimum is non-physical since it is in nighttime on that part of the world for this example.

The basic method is described as follows. First, the IMU 124 measures roll and pitch. Second, the heading is measured either using previous information from the Celestial Imaging Unit 110 or from an heading sensor 122. Third, the sky polarization map 153 is measured using the sky polarization channel in the Celestial Imaging Unit 110. Fourth, generate many different sky polarization reference maps using known time/date from a clock 123 or GPS 125, and known roll, pitch, and heading. For each reference map, vary the position (latitude/longitude) in a grid or randomly over the space intended to be searched. In some embodiments a starting seed may be used or provided by a previous measurement or GPS 125. In some embodiments this reference map may be the AoF of the sky. Other embodiments may use another polarization product for the map, such as DoLP, S1, or S2. Fifth, perform a match between the sky polarization map and each reference map. In some embodiments, this search may be performed intelligently, by learning that certain regions have bad matches for given inputs. This search may also be performed incrementally, by searching for smaller and smaller regions with more precise grids in order to achieve higher accuracy.

In some embodiments, this new position may be used as the position input for the Celestial Positioning System to determine heading. The mode (determining position or determining heading) may switch back and forth depending on the scenario. For example, the heading estimate may be stale due to movement of the platform.

Figure 14:
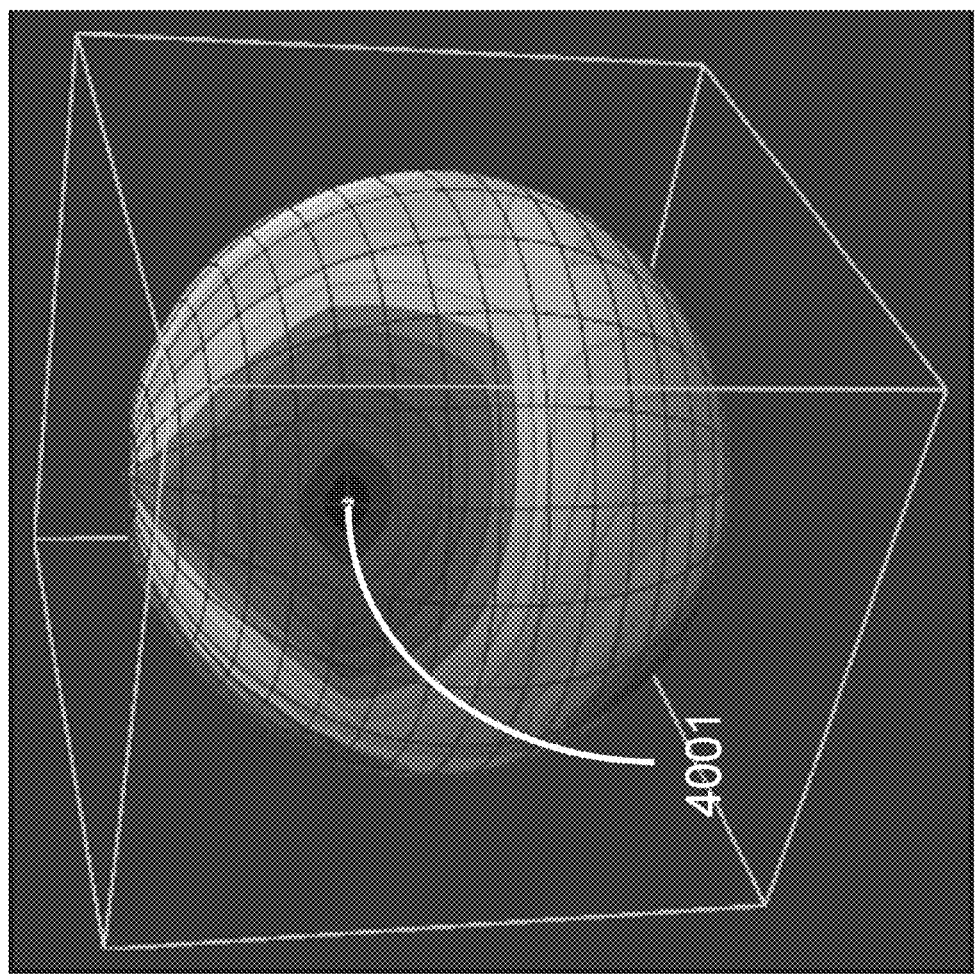
FIG. 14 depicts FIG. 13 overlaid onto a globe.

This method is depicted in FIG. 14, where 4001 is the minimum point and the true location on the globe. The figure shows a contour map showing a full Earth search space and simulated measurement. The values on the contour map represent the merit function value which is the difference between the measurement and reference maps (lower numbers mean better fits). The global minimum at 4001 perfectly matches the true location using this method without noise added to the simulated measurements.

Figure 15:
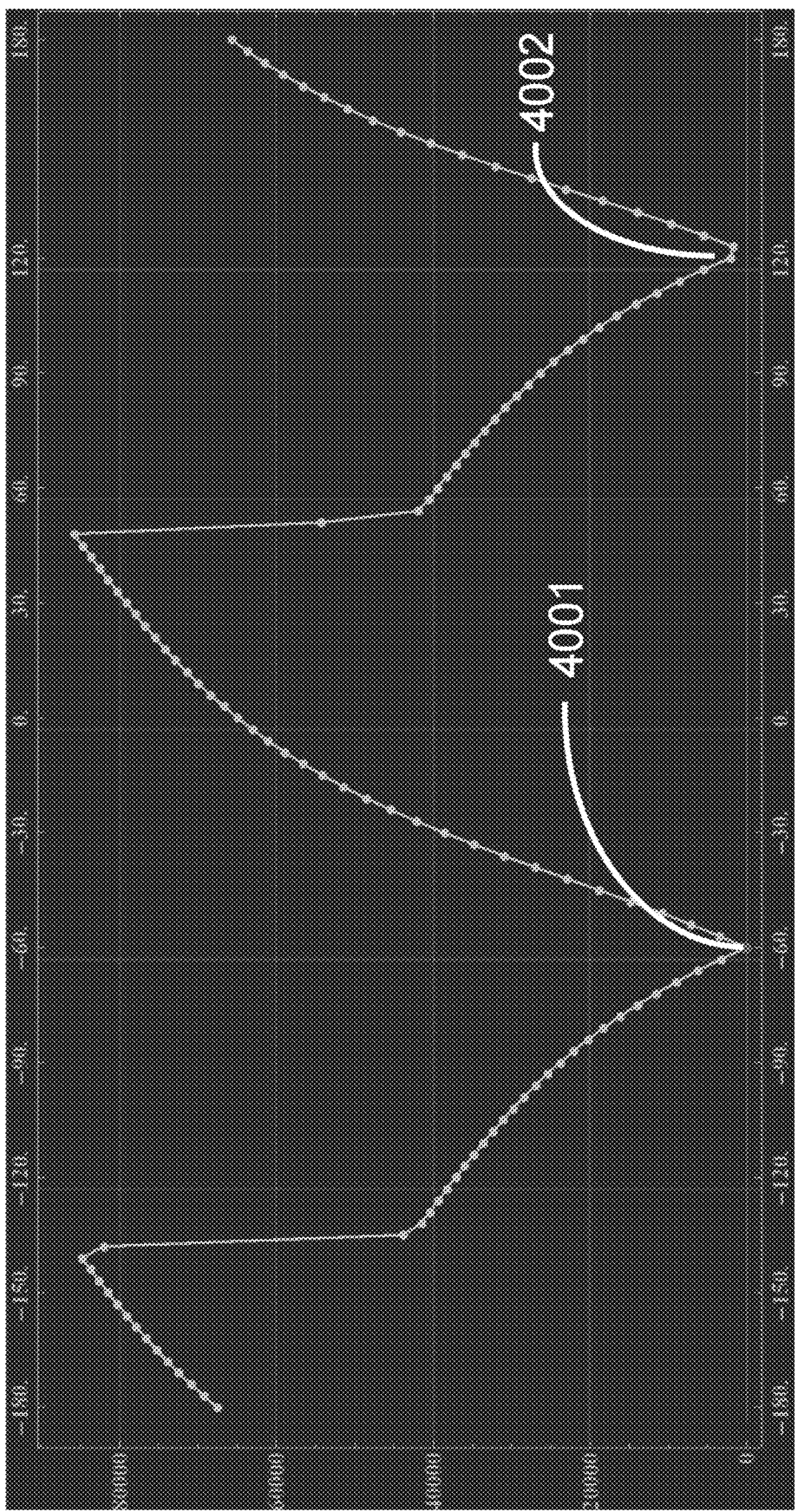
FIG. 15 depicts finding the longitude on Earth that best matches the measured celestial body azimuth and elevation in the sky.

In FIG. 15, the merit function results are plotted with the merit value in the y-axis and longitude in the x-axis. This assumes correct latitude. In FIG. 15, 4001 shows the same global minimum, whereas 4002 shows the local minimum on the other side of the Earth where it is nighttime. Thus, this incorrect local minimum can be filtered out.

What is claimed is:

1. A system for determining a new position and orientation of an object, comprising:
   a celestial imaging unit configured to record image data of the sky;
   an inertial measurement unit configured to provide roll and pitch;
   a clock configured to provide date and time;
   a heading sensor configured to provide heading;
   a signal processing unit,
   the signal processing unit configured to receive and store in memory the image data from the celestial imaging unit,
   the signal processing unit further configured to receive and store in memory the roll and pitch inputs from the inertial measurement unit,
   the signal processing unit further configured to receive and store in memory the heading from a heading sensor,
   the signal processing unit further configured to receive and store in memory the date and time from a clock,
   the signal processing unit further configured to measure the azimuth and elevation of a celestial body in the celestial imaging unit, the signal processing unit further configured to determine the latitude and longitude of the object using the measured azimuth and elevation of a celestial body, roll, pitch, heading, date, and time.

2. The system of claim 1, wherein the heading sensor is the celestial imaging unit configured to provide heading, using roll, pitch, date, time, and a prior position estimate of latitude and longitude.

3. The system of claim 1, wherein the signal processing unit is further configured to determine latitude and longitude using a direct equation using as inputs the azimuth and elevation of the celestial body, roll, pitch, heading, date, and time.

4. The system of claim 1, wherein the signal processing unit is further configured to determine latitude and longitude using an iterative search using a grid of search points on Earth, where the celestial body azimuth and elevation is predicted for each point, and the points are compared to the measured azimuth and elevation of the celestial body, and the best solution is the latitude and longitude.

5. The system of claim 4, wherein there are multiple best solutions which are then clustered, and then the largest cluster is averaged to provide the best solution for latitude and longitude.

6. The system of claim 5, wherein a trimming step occurs on the largest cluster to remove outliers and improve the latitude and longitude solution.

7. The system of claim 1, wherein the signal processing unit is further configured to use an initial position as a seed value.

8. The system of claim 1, wherein the celestial imaging unit has multiple optical channels configured to measure different celestial objects.

9. The system of claim 8, wherein one of the optical channels in the celestial imaging unit is a sky polarimeter configured to measure the polarization of the sky.

10. The system of claim 9, wherein the signal processing unit configured to find latitude and longitude compares measured sky polarization patterns with predicted sky polarization patterns.

11. A method of determining the position of an object, the method comprising: recording raw image data of the sky using a celestial imaging unit; obtaining last known roll, pitch, heading, date, and time data of the object; measuring the azimuth and elevation of a celestial body in the celestial imaging unit; using the roll, pitch, heading, date, time, and the measured azimuth and elevation of the celestial body to determine latitude and longitude of the object, where the celestial body may be the sun, moon, certain planets or certain stars,
   wherein the step of using the roll, pitch, heading, date, time, and the measured azimuth and elevation of a celestial body to determine latitude and longitude of the object comprises using an iterative search using a grid of search points on Earth, predicting the azimuth and elevation of the celestial body for each search point and comparing the search points with the measured azimuth and elevation of the celestial body, and where the best solution is the latitude and longitude.

12. The method of claim 11, wherein determining latitude and longitude of the object is performed using a direct equation using as inputs the azimuth and elevation of the celestial body, roll, pitch, heading, date, and time.

13. The method of claim 11, wherein the step of using the roll, pitch, heading, date, time, and the measured azimuth and elevation of a celestial body to determine latitude and longitude of the object comprises using an iterative search using a grid of search points on Earth, predicting the azimuth and elevation of the celestial body for each search point and comparing the search points with the measured azimuth and elevation of the celestial body, and where the best solution is the latitude and longitudecreating a grid of points on Earth to search, comparing the predicted ccicstial body azimuth and cicvation with the measured ccicstial object azimuth and cicvation to determine a figure of merit for each search point on Earth, and determining the latitude and longitude.

14. The method of claim 11, further comprising trimming the clusters prior to calculating the mean, in order to remove outliers.

15. The method of claim 11, further comprising fusing a position estimate and a position prediction of the object to determine a new position/orientation of the object.

16. The method of claim 11, further comprising using an initial position as a seed value.

17. The method of claim 11, wherein the last known heading is provided by the celestial imaging unit configured to provide heading, using roll, pitch, date, time, and a prior position estimate of latitude and longitude.

18. The method of claim 11, wherein finding latitude and longitude comprises comparing measured sky polarization patterns with predicted sky polarization patterns.

* * * * *